US012511707B2

(12) United States Patent
Park et al.

(10) Patent No.: US 12,511,707 B2
(45) Date of Patent: Dec. 30, 2025

(54) IMAGE PROCESSING APPARATUS AND OPERATION METHOD THEREOF FOR OBTAINING HIGH QUALITY IMAGE

(71) Applicant: SAMSUNG ELECTRONICS CO., LTD., Suwon-si (KR)

(72) Inventors: Jaeyeon Park, Suwon-si (KR); Iljun Ahn, Suwon-si (KR); Tammy Lee, Suwon-si (KR); Soomin Kang, Suwon-si (KR); Youngchan Song, Suwon-si (KR); Hanul Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 337 days.

(21) Appl. No.: 18/135,992

(22) Filed: Apr. 18, 2023

(65) Prior Publication Data

US 2023/0360169 A1    Nov. 9, 2023

Related U.S. Application Data

(63) Continuation of application No. PCT/KR2023/004669, filed on Apr. 6, 2023.

(30) Foreign Application Priority Data

May 9, 2022  (KR) .................. 10-2022-0056889
Oct. 14, 2022  (KR) .................. 10-2022-0132739

(51) Int. Cl.
*G06T 5/00*  (2024.01)
*G06T 3/40*  (2006.01)
(Continued)

(52) U.S. Cl.
CPC .................. *G06T 3/40* (2013.01); *G06T 5/50* (2013.01); *G06T 5/60* (2024.01); *G06T 2207/20016* (2013.01)

(58) Field of Classification Search
CPC ............ G06T 2207/20084; G06T 5/60; G06T 2207/20081; G06T 5/70;
(Continued)

(56) References Cited

U.S. PATENT DOCUMENTS 10,832,450 B2   11/2020  Tong et al.
10,853,986 B2   12/2020  Elgammal
(Continued)

FOREIGN PATENT DOCUMENTS

CN    108765295 A    11/2018
CN    110288537 A    9/2019
(Continued)

OTHER PUBLICATIONS

Ilesanmi, Ademola E., and Taiwo O. Ilesanmi. "Methods for image denoising using convolutional neural network: a review." Complex & Intelligent Systems 7.5 (2021): 2179-2198.*
(Continued)

*Primary Examiner* — Li Liu
(74) *Attorney, Agent, or Firm* — Sughrue Mion, PLLC

(57) ABSTRACT

An image processing apparatus for performing an image by using one or more neural networks may include a memory storing one or more instructions and at least one processor configured to execute the one or more instructions stored in the memory to obtain first feature information of a first image, generate an intermediate output image for the first image by performing first image processing on the first feature information, generate an attention map, based on the first image and the intermediate output image, obtain second feature information by performing second image processing on the first feature information, obtain fourth feature information by performing third image processing on third feature information extracted during the first image processing, and generate a second image having a higher quality than the
(Continued)

first image, based on the attention map, the second feature information, and the fourth feature information.

20 Claims, 16 Drawing Sheets

(51) Int. Cl.
*G06T 5/50* (2006.01)
*G06T 5/60* (2024.01)

(58) Field of Classification Search
CPC .......... G06T 2207/20221; G06N 3/045; G06N 3/0464; G06V 10/82; G06V 10/30; G06V 10/454
See application file for complete search history.

(56) References Cited

U.S. PATENT DOCUMENTS

| | | | |
|---|---|---|---|
| 11,600,001 B2 | 3/2023 | Lee et al. | |
| 2019/0378247 A1* | 12/2019 | Huang | G06T 5/70 |
| 2020/0311878 A1* | 10/2020 | Matsuura | G06V 10/82 |
| 2021/0287342 A1 | 9/2021 | Yang et al. | |
| 2021/0295474 A1* | 9/2021 | Wang | G06N 3/084 |
| 2023/0080693 A1* | 3/2023 | Hu | G06T 5/70 |
| | | | 382/275 |
| 2023/0109090 A1* | 4/2023 | Maharjan | G06T 7/11 |
| | | | 382/254 |
| 2023/0342885 A1* | 10/2023 | Zhao | G06T 5/70 |
| 2025/0095116 A1* | 3/2025 | Lei | G06T 7/001 |

FOREIGN PATENT DOCUMENTS

| | | |
|---|---|---|
| CN | 112116527 A | 12/2020 |
| CN | 112288626 A | 1/2021 |
| CN | 113298736 A | 8/2021 |
| KR | 10-2019-0113119 A | 10/2019 |
| KR | 10-2020-0084434 A | 7/2020 |
| KR | 10-2021-0114856 A | 9/2021 |
| KR | 10-2296644 B1 | 9/2021 |

OTHER PUBLICATIONS

Xun Huang et al, 'Arbitrary Style Transfer in Real-Time With Adaptive Instance Normalization', 2017 IEEE International Conference on Computer Vision (ICCV), pp. 1510-1519,Oct. 22-29, 2017 Total pp. 12.

International Search Report and Written Opinion (PCT/ISA/210 & 237) dated Jul. 7, 2023 issued by the International Searching Authority in counterpart International Application No. PCT/KR2023/004669.

Zhu, H.; Xie, C.; Fei, Y.; Tao, H. "Attention Mechanisms in CNN-Based Single Image Super-Resolution: A Brief Review and a New Perspective", Electronics, May 15, 2021, 10, 1187, 16 pages, https://doi.org/10.3390/electronics10101187.

Xintao Wang et al., "Recovering Realistic Texture in Image Super-resolution by Deep Spatial Feature Transform", Computer Vision and Pattern Recognition (CVPR), Apr. 2018, pp. 606-615.

Xintao Wang et al., "Towards Real-World Blind Face Restoration with Generative Facial Prior", Computer Vision and Pattern Recognition (CVPR), Jan. 2021, pp. 9168-9178.

* cited by examiner

IMAGE PROCESSING APPARATUS AND OPERATION METHOD THEREOF FOR OBTAINING HIGH QUALITY IMAGE

CROSS-REFERENCE TO RELATED APPLICATION(S)

This application is a bypass continuation application of PCT Application No. PCT/KR2023/004669, filed on Apr. 6, 2023, which is based on and claims priority under 35 U.S.C. § 119(a) from Korean Patent Application No. 10-2022-0056889, filed on May 9, 2022, and Korean Patent Application No. 10-2022-0132739, filed on Oct. 14, 2022, in the Korean Intellectual Property Office, the disclosures of which are incorporated by reference herein in their entirety.

BACKGROUND ART

1. Field

The disclosure relates to an image processing apparatus for processing an image, in particular, to an image processing apparatus for processing an image using a neural network, and an operation method of the image processing apparatus.

2. Description of Related Art

As data traffic increases exponentially with the development of computer technology, artificial intelligence has become an important trend that will drive future innovations. Artificial intelligence is a method of imitating human thinking, and as such, artificial intelligence applicable to various industries. Examples of artificial intelligence technologies may include pattern recognition, machine learning, expert systems, neural networks, natural language processing, etc.

A neural network models the characteristics of human biological nerve cells by using mathematical expressions, and uses an algorithm that mimics the human ability to learn. Through this algorithm, a neural network is able to generate mapping between input data and output data, and the ability to generate such mapping may be called the learning capability of the neural network. Furthermore, neural networks have a generalization ability to generate, based on training results, correct output data with respect to input data that has not been used for training.

A neural network may be used for image processing, and in particular, image processing for removing noise or artifacts from an image or increasing the quality or resolution of the image may be performed using a deep neural network (DNN).

SUMMARY

An image processing apparatus according to an example embodiment of the disclosure may process an image by using one or more neural networks.

According to an aspect of the disclosure, there is provided an image processing apparatus for processing an image using one or more neural networks, the image processing apparatus may include a memory storing one or more instructions.

The at least one processor may be further configured to execute the one or more instructions stored in the memory to: obtain first feature information of a first image.

The at least one processor may be further configured to execute the one or more instructions stored in the memory to generate an output image by performing a first processing on the first feature information.

The at least one processor may be further configured to execute the one or more instructions stored in the memory to generate an attention map based on the first image and the output image.

The at least one processor may be further configured to execute the one or more instructions stored in the memory to obtain second feature information by performing a second processing on the first feature information.

The at least one processor may be further configured to execute the one or more instructions stored in the memory to obtain third feature information during the first processing The at least one processor may be further configured to execute the one or more instructions stored in the memory to obtain fourth feature information by performing a third processing on the third feature information.

The at least one processor may be further configured to execute the one or more instructions stored in the memory to generate a second image having a second quality that is higher quality than a first quality of the first image, the generating the second image being based on the attention map, the second feature information, and the fourth feature information.

The at least one processor may be further configured to execute the one or more instructions stored in the memory to obtain a residual map corresponding to the first image and the output image.

The at least one processor may be further configured to execute the one or more instructions stored in the memory to obtain a local map and global variance values for the residual map.

The at least one processor may be further configured to execute the one or more instructions stored in the memory to generate the attention map, based on the local map and the global variance values.

The local map may include local variance values of the residual map, the local variance values being obtained using a window having a first size.

The global variance values may be obtained using a patch having a second size greater than the first size.

The at least one processor may be further configured to execute the one or more instructions stored in the memory to obtain fifth feature information by performing a fourth processing on the attention map.

The at least one processor may be further configured to execute the one or more instructions stored in the memory to obtain sixth feature information based on the second feature information and the fifth feature information.

The at least one processor may be further configured to execute the one or more instructions stored in the memory to generate the second image based on the sixth feature information and the fourth feature information.

The at least one processor may be further configured to execute the one or more instructions stored in the memory to obtain seventh feature information by performing a fifth processing on the attention map.

The at least one processor may be further configured to execute the one or more instructions stored in the memory to generate the second image based on the second feature information, the fourth feature information, and the seventh feature information.

The one or more neural networks may include one or more convolutional neural networks.

The at least one processor may be further configured to execute the one or more instructions stored in the memory to obtain the first feature information of the first image by using the one or more convolutional neural networks.

The first processing may include upsampling the first feature information, and wherein the first image and the output image both have a same size.

The second processing may be performed by a multi-layer perceptron (MLP) module including one or more fully connected layers.

The at least one processor may be further configured to execute the one or more instructions stored in the memory to perform a multiplication operation between input data fed to a fully connected layer and a weight matrix included in the fully connected layer and an addition operation with biases included in the fully connected layer.

The at least one processor may be further configured to execute the one or more instructions stored in the memory to obtain the fourth feature information by performing a convolution operation based on the third feature information and pre-trained weights.

The at least one processor may be further configured to execute the one or more instructions stored in the memory to obtain eighth feature information by performing a first operation on the second feature information.

The at least one processor may be further configured to execute the one or more instructions stored in the memory to generate the second image by performing a second operation on the eighth feature information and the fourth feature information.

The first operation may include an adaptive instance normalization (AdaIN) operation, and the second operation may include a spatial feature transform (SFT) operation.

The at least one processor may be further configured to execute the one or more instructions stored in the memory to obtain classification information of the first image.

The at least one processor may be further configured to execute the one or more instructions stored in the memory to generate the output image by performing the first processing on the first feature information and the classification information.

The second image of the second quality, may have less artifacts or less noise, when compared to the first image of the first quality.

According to an aspect of the disclosure, there is provided an operation method of an image processing apparatus for processing an image by using one or more neural networks, the operation method may include obtaining first feature information of a first image.

The operating method of the image processing apparatus for processing an image by using at least one neural network, may include generating an output image by performing a first processing on the first feature information.

The operating method of an image processing apparatus for processing an image by using at least one neural network, may include generating an attention map, based on the first image and the output image.

The operating method of an image processing apparatus for processing an image by using at least one neural network, may include obtaining second feature information by performing a second processing on the first feature information.

The operating method of an image processing apparatus for processing an image by using at least one neural network, may include obtain third feature information during the first processing, obtaining fourth feature information by performing a third processing on the third feature information.

The operating method of an image processing apparatus for processing an image by using at least one neural network, may include generating a second image having a second quality that is higher than a first quality of the first image, the generating the second image being based on the attention map, the second feature information, and the fourth feature information.

According to an aspect of the disclosure, there is provided a computer-readable recording medium having stored therein a program for performing the operation method including: obtaining first feature information of a first image; generating an output image by performing a first processing on the first feature information; generating an attention map, based on the first image and the output image; obtaining second feature information by performing a second processing on the first feature information; obtain third feature information during the first processing, obtaining fourth feature information by performing a third processing on the third feature information; and generating a second image having a second quality that is higher than a first quality of the first image, the generating the second image being based on the attention map, the second feature information, and the fourth feature information.

DETAILED DESCRIPTION

Figure 1:
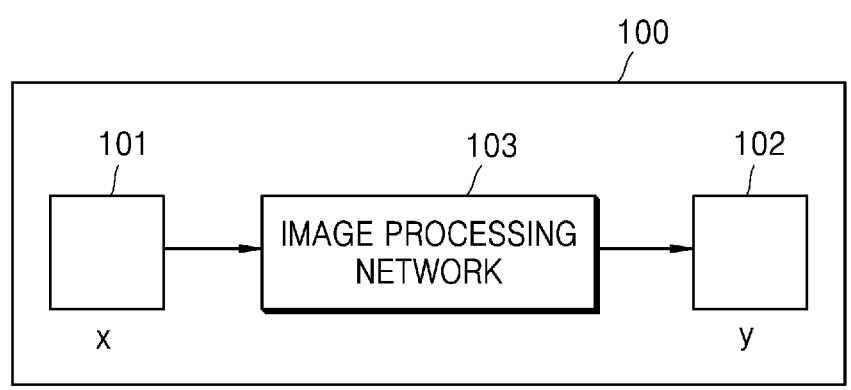
FIG. 1 is a diagram illustrating an operation of an image processing apparatus processing an image by using an image processing network, according to an example embodiment of the disclosure.

Throughout the disclosure, the expression "at least one of a, b or c" indicates only a, only b, only c, both a and b, both a and c, both b and c, all of a, b, and c, or variations thereof.

Terms used in the present specification will now be briefly described and then the disclosure will be described in detail.

As the terms used herein, general terms that are currently widely used are selected by taking functions according to the disclosure into account, but the terms may have different meanings according to the intention of one of ordinary skill in the art, precedent cases, advent of new technologies, or the like. Furthermore, specific terms may be arbitrarily selected by the applicant, and in this case, the meaning of the selected terms will be described in detail in the detailed description of the disclosure. Thus, the terms used herein should be defined not by simple appellations thereof, but based on the meaning of the terms together with the overall description of the disclosure.

Throughout the specification, when a part "includes" or "comprises" an element, unless there is a particular description contrary thereto, it is understood that the part may further include other elements, not excluding the other elements. In addition, terms such as "portion", "module", etc., described in the specification, refer to a unit for processing at least one function or operation and may be implemented as hardware or software, or a combination of hardware and software.

Embodiments of the disclosure will be described more fully hereinafter with reference to the accompanying drawings so that they may be easily implemented by one of ordinary skill in the art. However, the disclosure may have different forms and should not be construed as being limited to embodiments thereof set forth herein. In addition, parts not related to descriptions of the disclosure are omitted to clearly explain embodiments of the disclosure in the drawings, and like reference numerals denote like elements throughout.

FIG. 1 is a diagram illustrating an operation of an image processing apparatus processing an image by using an image processing network, according to an example embodiment of the disclosure.

Referring to FIG. 1, an image processing network 103 according to an example embodiment of the disclosure may receive a first image 101 and process the first image 101 to generate a second image 102. According to an example embodiment, the first image 101 may be an image including noise or artifacts, and/or may be a low-resolution image or a low-quality image. An image processing apparatus 100 according to an example embodiment of the disclosure may use the image processing network 103 to generate the second image 102 by performing denoising for removing noise while maintaining fine edges and textures of the first image 101. The second image 102 may have a higher quality than the first image 101. For example, the second image may have less noise and artifacts than the first image 101. The second image 102 may have a higher resolution than the first image 101. However, the disclosure is not limited thereto. As such, according to another example embodiment, the second image 102 may have one or more characteristics or features that are improved when compared to the first image 101.

According to an example embodiment of the disclosure, the image processing network 103 may include one or more neural networks. For example, the image processing network 103 may include a map generator, a first module, a second module and a third module. However, the disclosure is not limited thereto.

Hereinafter, the image processing network 103 according to an example embodiment of the disclosure will be described in detail with reference to FIG. 2.

Figure 2:
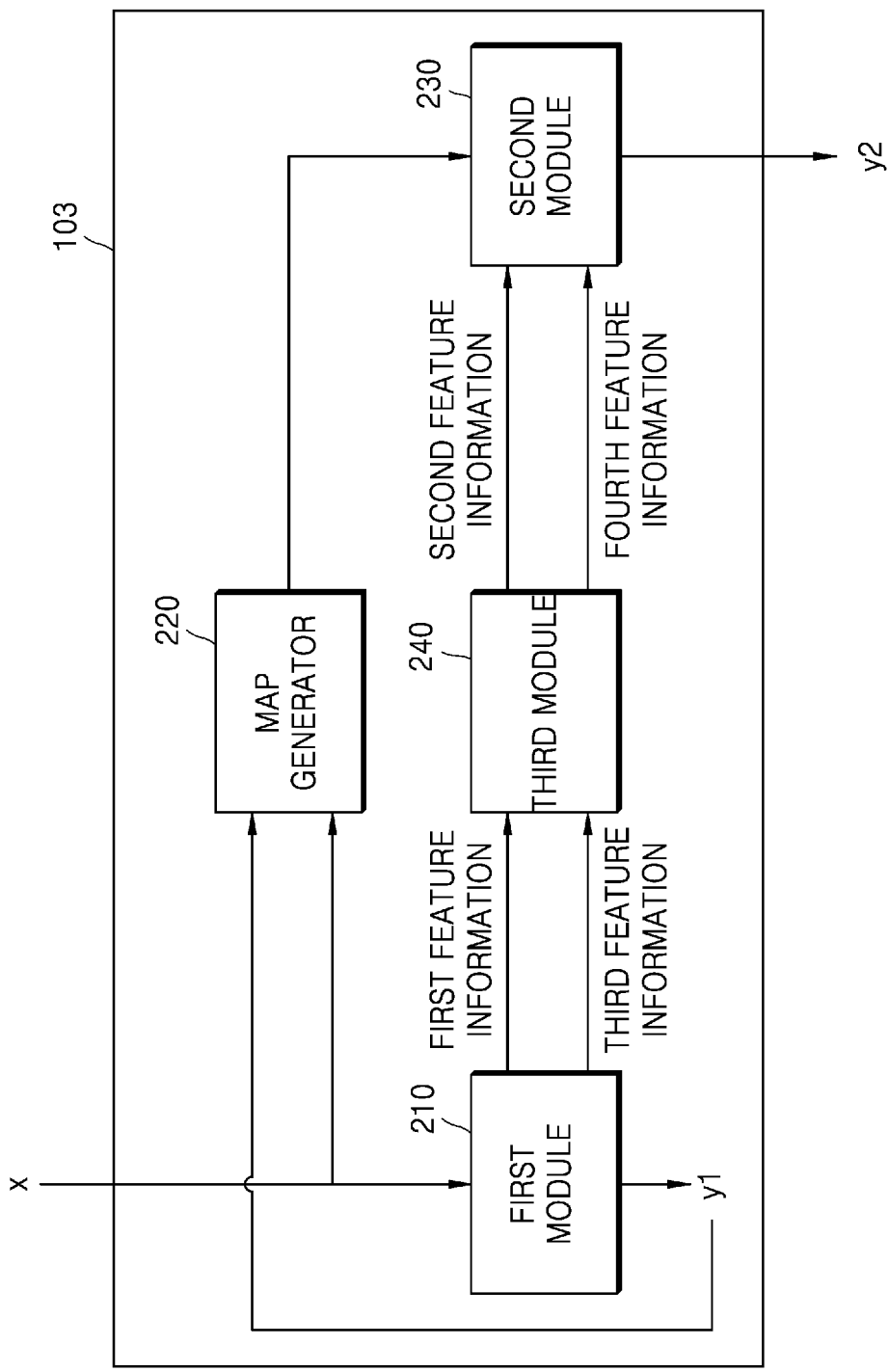
FIG. 2 is a diagram illustrating an image processing network according to an example embodiment of the disclosure.

FIG. 2 is a diagram illustrating an image processing network according to an example embodiment of the disclosure.

Referring to FIG. 2, according to an example embodiment of the disclosure, the image processing network 103 may include a first module 210, a map generator 220, a second module 230, and a third module 240.

A first image x may be input to the first module 210 according to an example embodiment of the disclosure. The first module 210 may obtain first feature information of the first image x.

The first feature information of the first image x obtained by the first module 210 may be input to the third module 240.

Also, the first module 210 may generate an intermediate output image y1 based on the first feature information of the first image x. For example, the first module 210 may generate the intermediate output image y1 by performing first image processing on the first feature information of the first image x. The intermediate output image y1 may be an image obtained by removing artifacts from the first image x. However, the disclosure is not limited thereto. As such, according to another example embodiment, the first module 210 may process the first image x to improve one or more characteristics of the first image x and output the processed image as an intermediate output image y1.

Furthermore, the first module 210 may obtain third feature information extracted during the first image processing, and the third feature information may be input to the third module 240.

Hereinafter, a detailed configuration of each of the first to third modules 210, 230, and 240 according to an example embodiment of the disclosure will be described in detail with reference to the drawings.

Figure 3:
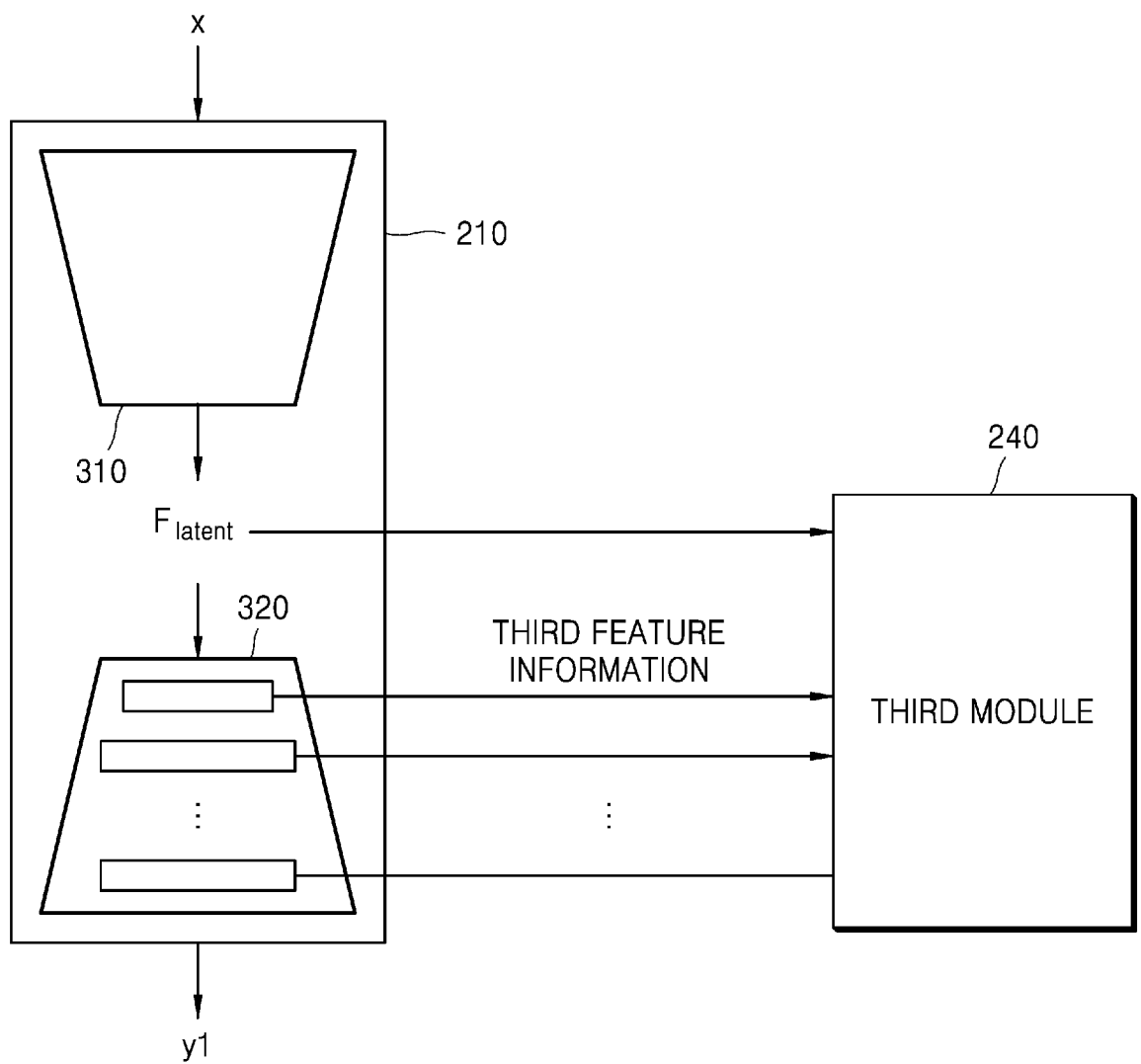
FIG. 3 is a diagram illustrating a first module according to an example embodiment of the disclosure.

FIG. 3 is a diagram illustrating a first module according to an example embodiment of the disclosure.

Referring to FIG. 3, the first module 210 may include a first feature extractor 310 and an intermediate image generator 320.

According to an example embodiment of the disclosure, the first feature extractor 310 may include a feature extraction network, and the feature extraction network may include one or more convolution layers. A first image x may be input to the first feature extractor 310, and the first feature extractor 310 may obtain first feature information $F_{latent}$ of the first image x by using the feature extraction network.

Alternatively, according to an example embodiment of the disclosure, the first feature extractor 310 may obtain classification information of the first image x by using a feature extraction network. In this case, the classification information of the first image x may include data indicating a probability that the first image x is included in each of a plurality of preset categories.

A detailed configuration of the first feature extractor 310 will be described with reference to FIG. 4.

Figure 4:
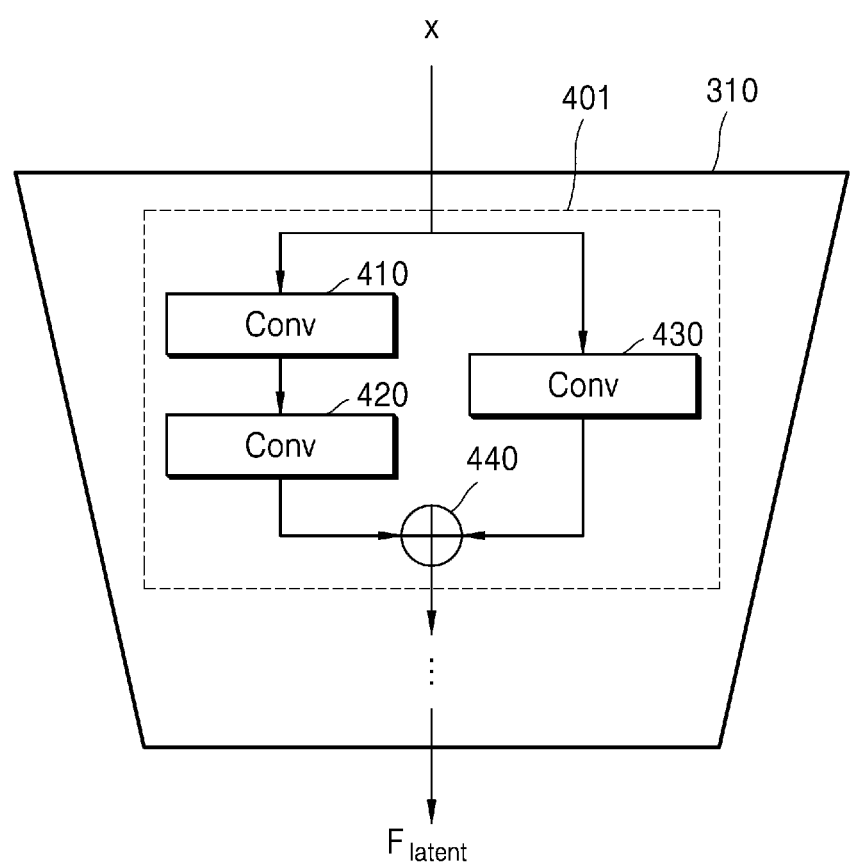
FIG. 4 is a diagram illustrating a first feature extractor according to an example embodiment of the disclosure.

FIG. 4 is a diagram illustrating a first feature extractor according to an example embodiment of the disclosure.

Referring to FIG. 4, according to an example embodiment of the disclosure, the first feature extractor 310 may obtain first feature data by performing a convolution operation based on the first image x and a first weight included in a first convolution layer 410. For example, the first feature extractor 310 may perform the convolution operation between the first image x and the first weight to obtain first feature data. The first feature extractor 310 may obtain second feature data by performing a convolution operation based on the first feature data and a second weight included in a second convolution layer 420. For example, first feature extractor 310 may perform the convolution operation between the first feature data and the second weight to obtain the second feature data.

Furthermore, the first feature extractor 310 may obtain third feature data by performing a convolution operation based on the first image x and a third weight included in a third convolution layer 430. For example, the first feature extractor 310 may perform the convolution operation based on the first image x and the third weight to obtain the third feature data.

Also, the first feature extractor 310 may perform, in an addition layer 440, an element-wise addition operation between the second feature data and the third feature data.

According to an example embodiment of the disclosure, the first feature extractor 310 may include a structure in which a module 401 includes the first convolution layer 410, the second convolution layer 420, the third convolution layer 430, and the addition layer 440. Moreover, according to an example embodiment, the first feature extractor 310 may include a structure in which the module 401 is repeatedly arranged in series. For example, the first feature extractor 310 may include a structure having a plurality of first convolution layers 410, a plurality of second convolution layers 420, a plurality of third convolution layers 430, and a plurality of addition layers 440.

However, the first feature extractor 310 is not limited thereto, and may include various structures serving as an encoder capable of extracting feature information of the first image x.

Accordingly, the first feature extractor 310 may obtain first feature information $F_{latent}$ of the first image x. In this case, the first feature information $F_{latent}$ may be data in a vector form.

Alternatively, according to an example embodiment of the disclosure, the first feature extractor 310 may obtain classification information of the first image x. In this case, the classification information of the first image x may include data indicating a probability that the first image x is included in each of a plurality of categories. According to an embodiment, the categories are preset or predetermined categories. As such, the classification information of the first image x may include data indicating a probability that the first image x is included in each of a plurality of preset or predetermined categories.

Referring back to FIG. 3, the first feature information $F_{latent}$ of the first image x may be input to the third module 240.

Moreover, the intermediate image generator 320 may generate an intermediate output image y1 based on the first feature information $F_{latent}$ of the first image x obtained by the first feature extractor 310. The intermediate image generator 320 may generate the intermediate output image y1 by using an intermediate image generation network. The intermediate image generation network may include one or more convolution layers.

Alternatively, the intermediate image generator 320 may generate the intermediate output image y1, based on the first feature information $F_{latent}$ and the classification information of the first image x. However, the disclosure is not limited thereto.

A detailed configuration of the intermediate image generator 320 will be described in detail with reference to FIG. 5.

Figure 5:
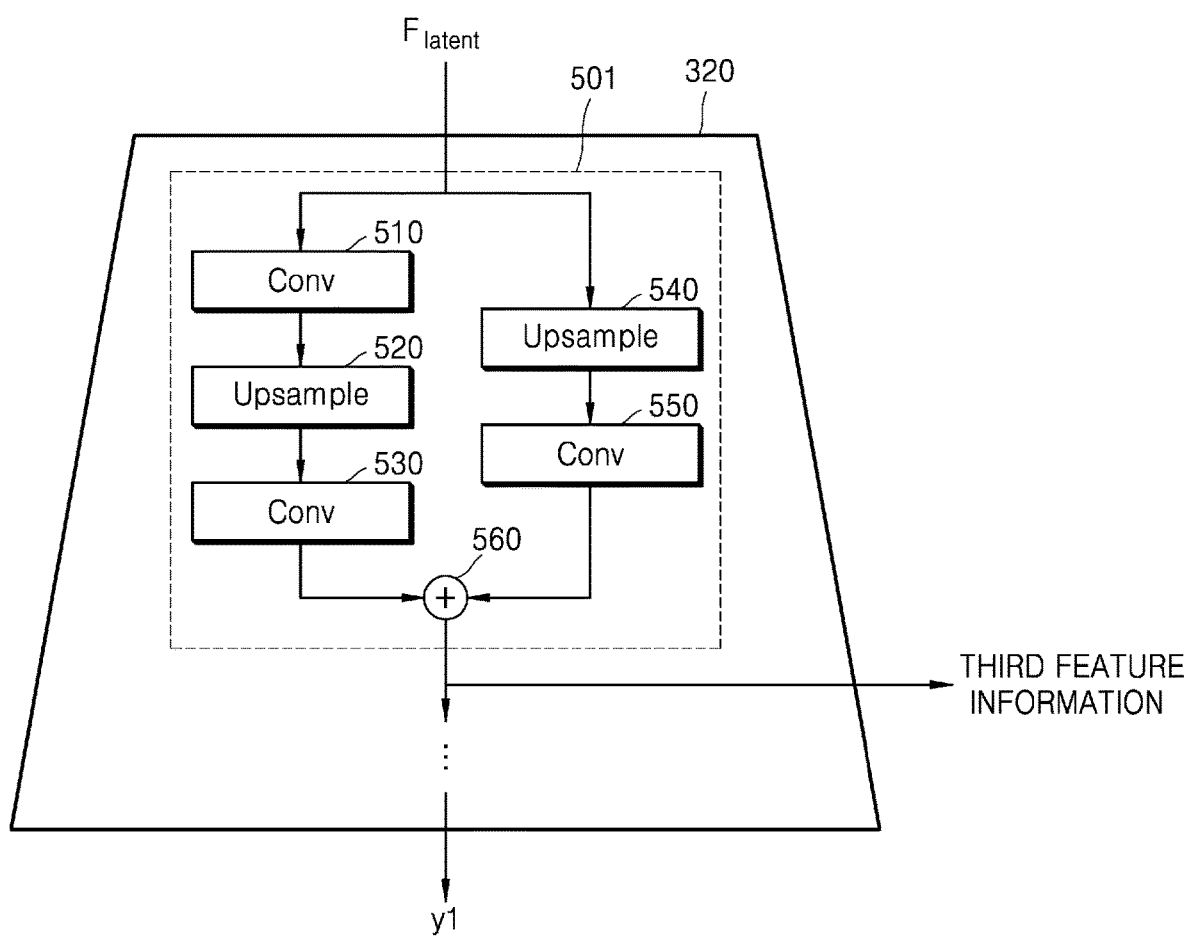
FIG. 5 is a diagram illustrating an intermediate image generator according to an example embodiment of the disclosure.

FIG. 5 is a diagram illustrating an intermediate image generator according to an example embodiment of the disclosure.

Referring to FIG. 5, according to an example embodiment of the disclosure, the intermediate image generator 320 may obtain fourth feature data by performing a convolution operation based on first feature information $F_{latent}$ of a first image and a fourth weight included in a fourth convolution layer 510. For example, the intermediate image generator 320 may perform a convolution operation between first feature information $F_{latent}$ of the first image and the fourth weight to obtain the fourth feature dat.

The intermediate image generator 320 may perform upsampling on the fourth feature data in a first upsampling layer 520 to obtain the first upsampled data. For example, the intermediate image generator 320 may perform upsampling by using an interpolation method such as bicubic interpolation or bilinear interpolation. Alternatively, the intermediate image generator 320 may perform upsampling using a convolution operation. However, the disclosure is not limited thereto. As such, according to another example embodiment, the intermediate image generator 320 may perform upsampling using another method.

The intermediate image generator 320 may obtain fifth feature data by performing a convolution operation based on the first upsampled data and a fifth weight included in a fifth convolution layer 530. For example, the intermediate image generator 320 may perform a convolution operation between the first upsampled data and the fifth weight to obtain the fifth feature data.

The intermediate image generator 320 may perform, in a second upsampling layer 540, upsampling on the first feature information $F_{latent}$ of the first image to obtain a second upsampled data.

For example, the intermediate image generator 320 may perform upsampling by using an interpolation method such as bicubic interpolation or bilinear interpolation. Alternatively, the intermediate image generator 320 may perform upsampling using a convolution operation. However, the disclosure is not limited thereto.

The intermediate image generator 320 may obtain sixth feature data by performing a convolution operation based on the second upsampled data and a sixth weight included in a sixth convolution layer 550. For example, the intermediate image generator 320 may perform a convolution operation based on the second upsampled data and the sixth weight to obtain the sixth feature data.

The intermediate image generator 320 may perform, in an addition layer 560, an element-wise addition operation between the fifth feature data and the sixth feature data.

According to an example embodiment of the disclosure, the intermediate image generator 320 may include a structure in which a module 501 including the fourth convolution layer 510, the first upsampling layer 520, the fifth convolution layer 530, the second upsampling layer 540, the sixth convolution layer 550, and the addition layer 560 is repeatedly arranged in series. However, the disclosure is not limited thereto.

In other words. the intermediate image generator 320 is not limited thereto, and may include various structures serving as a decoder capable of generating an intermediate output image by removing artifacts from the first image based on feature information of the first image.

The intermediate image generator 320 may input, to the third module 240, third feature information output from each module 501 in the structure in which the module 501 is repeatedly arranged in series.

Figure 6:
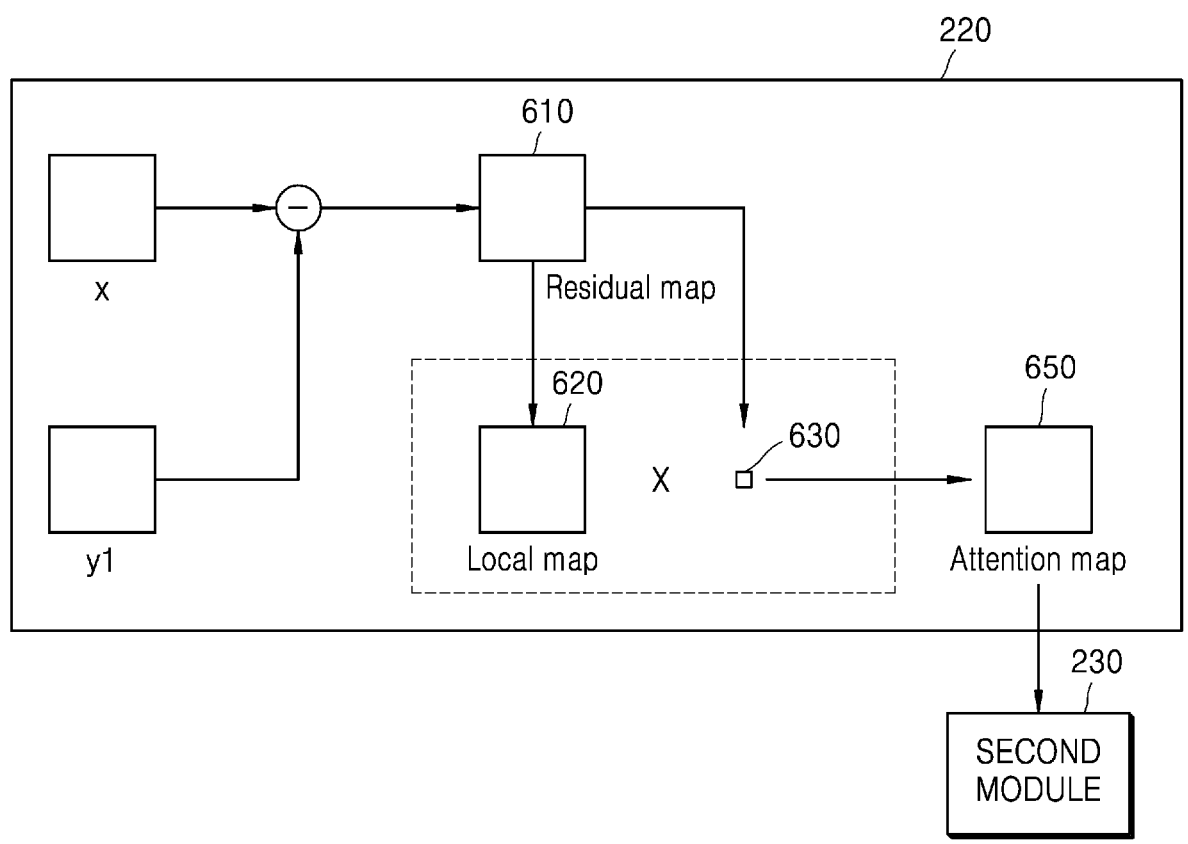
FIG. 6 is a diagram illustrating a map generator according to an example embodiment of the disclosure.

FIG. 6 is a diagram illustrating a map generator according to an example embodiment of the disclosure.

Referring to FIG. 6, the map generator 220 may generate an attention map 650, based on a first image x and an intermediate output image y1.

According to an example embodiment of the disclosure, the map generator 220 may obtain a residual map 610 representing difference information between the first image x and the intermediate output image y1. For example, the map generator 220 may obtain the residual map 610 by performing an element-wise subtraction operation between the first image x and the intermediate output image y1.

The intermediate output image y1 may be an image obtained by removing artifacts from the first image x, and thus, the residual map 610 may indicate information about the artifacts on the first image x. However, the disclosure is not limited thereto.

The map generator 220 may obtain a local map 620 and global variance values 630 by using the residual map 610.

For example, while moving a window having a first size over one pixel in the residual map 610 at a time, the map generator 220 may obtain variance values of pixels included in the window among pixels in the residual map 610 and generate the local map 620 including the obtained variance values. Here, the obtaining variance values may be referred to as local variance values. In this case, the number of the obtained local variance values may be equal to the number of pixels included in the residual map 610, and the local map 620 may have the same size as the residual map 610.

Furthermore, the map generator 220 may obtain global variance values 630 by using a region having a second size greater than the first size. For example, the map generator 220 may divide the residual map 610 into regions having a second size and respectively obtain variance values for the regions. Here, the obtained variance values may be referred to as global variance values. In this case, the number of the obtained global variance values may be equal to the number of the regions. According to an example embodiment, the regions may be referred to as patches.

The map generator 220 may generate the attention map 650 by multiplying the local map 620 by global variance values respectively corresponding to the patches.

The attention map 650 generated by the map generator 220 may be input to the second module 230.

Figure 7:
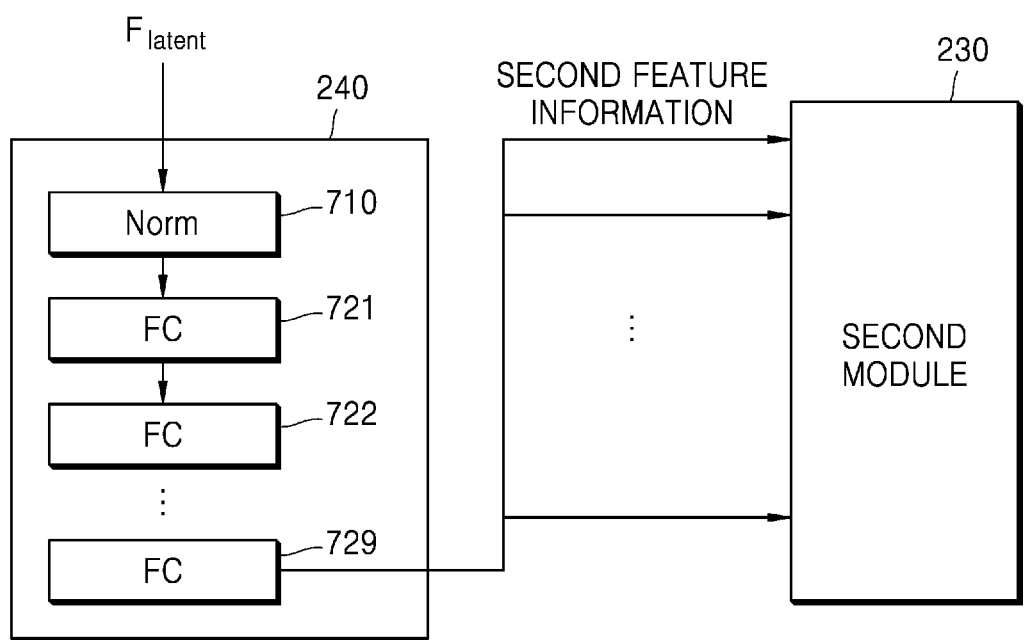
FIG. 7 is a diagram illustrating a method, performed by a third module, of processing first feature information of a first image, according to an example embodiment of the disclosure.
Figure 8:
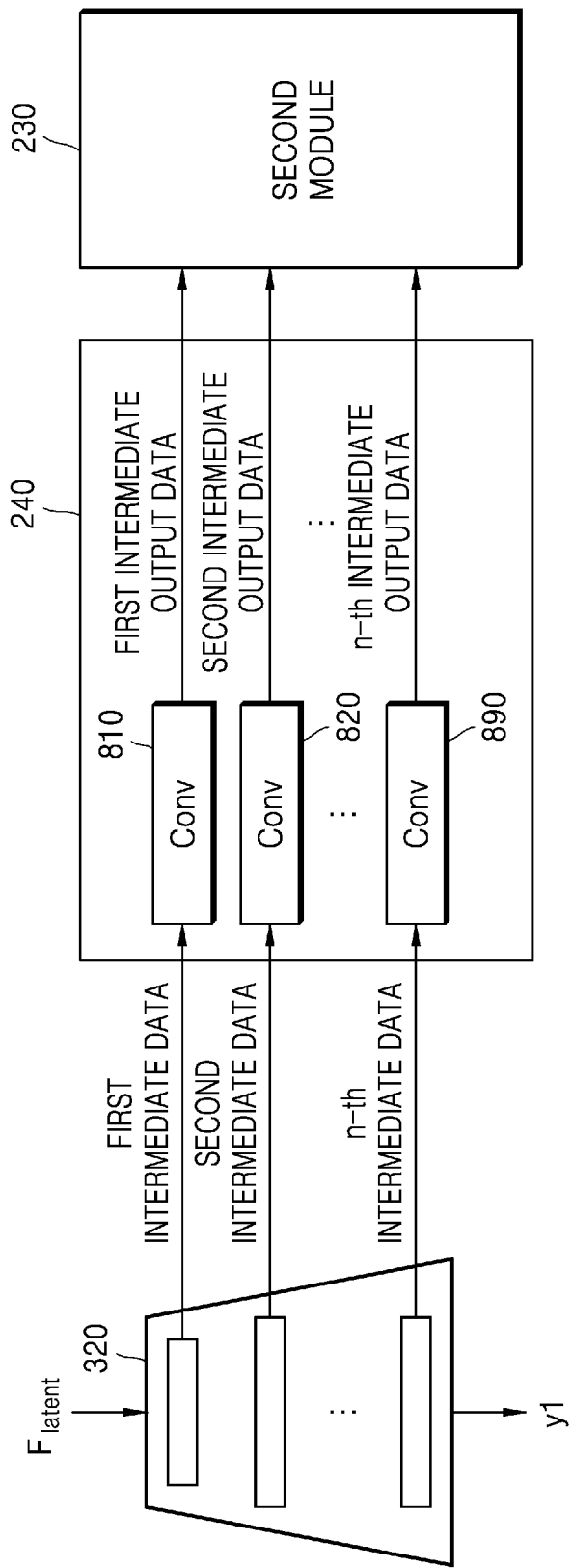
FIG. 8 is a diagram illustrating a method, performed by a third module, of processing third feature information, according to an example embodiment of the disclosure.

FIGS. 7 and 8 are diagrams illustrating a third module according to an example embodiment of the disclosure.

FIG. 7 is a diagram illustrating a method, performed by a third module, of processing first feature information $F_{latent}$ of a first image, according to an example embodiment of the disclosure. According to an example embodiment, the third module 240 may include a normalization layer 710, and a plurality of fully connected (FC) layers, including a first FC layer 721, a second FC layer 722, and a n FC layer 729.

Referring to FIG. 7, the third module 240 may normalize, in a normalization layer 710, the first feature information $F_{latent}$ of the first image input from the first module 210. For example, the third module 240 may normalize the first feature information $F_{latent}$ so that the sum of the first feature information $F_{latent}$ becomes 1. However, the disclosure is not limited thereto, and the first feature information $F_{latent}$ may be normalized using various normalization techniques. Data (e.g., first data) obtained by normalizing the first feature information $F_{latent}$ may be input to a multi-layer perceptron (MLP) module.

According to an example embodiment of the disclosure, the third module 240 may include the MLP module, and the MLP module may include n fully connected (FC) layers, where n is an integer. The first data may be input to a first FC layer 721.

The third module 240 may perform a multiplication operation between the first data and a first weight matrix included in the first FC layer 721 and an addition operation with biases included in the first FC layer 721.

The third module 240 may perform a multiplication operation between second data output from the first FC layer 721 and a second weight matrix included in a second FC layer 722 and an addition operation with biases included in the second FC layer 722.

Furthermore, the third module 240 may obtain second feature information by performing a multiplication operation between third data output from an n−1-th FC layer and a third weight matrix included in an n-th FC layer 729 and an addition operation with biases included in the n-th FC layer 729.

The second feature information output from the n-th FC layer 729 may be input to the second module 230.

Alternatively, according to an example embodiment of the disclosure, the third module 240 may obtain the second feature information by processing together the first feature information $F_{latent}$ and classification information.

FIG. 8 is a diagram illustrating a method, performed by a third module, of processing third feature information, according to an example embodiment of the disclosure.

Referring to FIG. 8, third feature information output from the first feature image generator 320 of the first module 210 may be input to the third module 240.

According to an example embodiment of the disclosure, the third feature information may include a plurality of pieces of intermediate data output during a process of generating an intermediate output image y1 based on first feature information $F_{latent}$ of a first image. For example, the plurality of pieces of intermediate data may include n pieces of intermediate data, where n is an integer. For example, the plurality of pieces of intermediate data may include a first intermediate data, a second intermediate data, . . . , and a n-th intermediate data.

For example, as described with reference to FIG. 5, the pieces of first to n-th intermediate data may be respectively output from the plurality of modules 501 included in the first feature image generator 320.

According to an example embodiment of the disclosure, the third module 240 may obtain fourth feature information by respectively performing convolution operations between the pieces of first to n-th difference information and weights respectively included in first to n-th convolution layers 810, 820, . . . , and 890.

For example, the third module 240 may obtain first intermediate output data by performing a convolution operation based on the first intermediate data and a first weight included in the first convolution layer 810. For example, the third module 240 may perform a convolution operation based on the first intermediate data and the first weight included in the first convolution layer 810 to obtain the first intermediate output data.

The third module 240 may obtain second intermediate output data by performing a convolution operation based on the second intermediate data and a second weight included in the second convolution layer 820. For example, the third module 240 may perform a convolution operation based on the second intermediate data and the second weight included in the second convolution layer 820 to obtain the second intermediate output data.

In addition, the third module 240 may obtain n-th intermediate output data by performing a convolution operation based on the n-th intermediate data and an n-th weight included in the n-th convolution layer 890. For example, the third module 240 may perform a convolution operation based on the n-th intermediate data and the n-th weight included in the n-th convolution layer 890 to obtain the n-th intermediate output data. According to an example embodiment of the disclosure, the fourth feature information may include pieces of the first to n-th intermediate output data.

The pieces of first to n-th intermediate output data (the fourth feature information) output from the third module 240 may be input to the second module 230.

A detailed configuration of the second module 230 will be described in detail with reference to FIG. 9.

Figure 9:
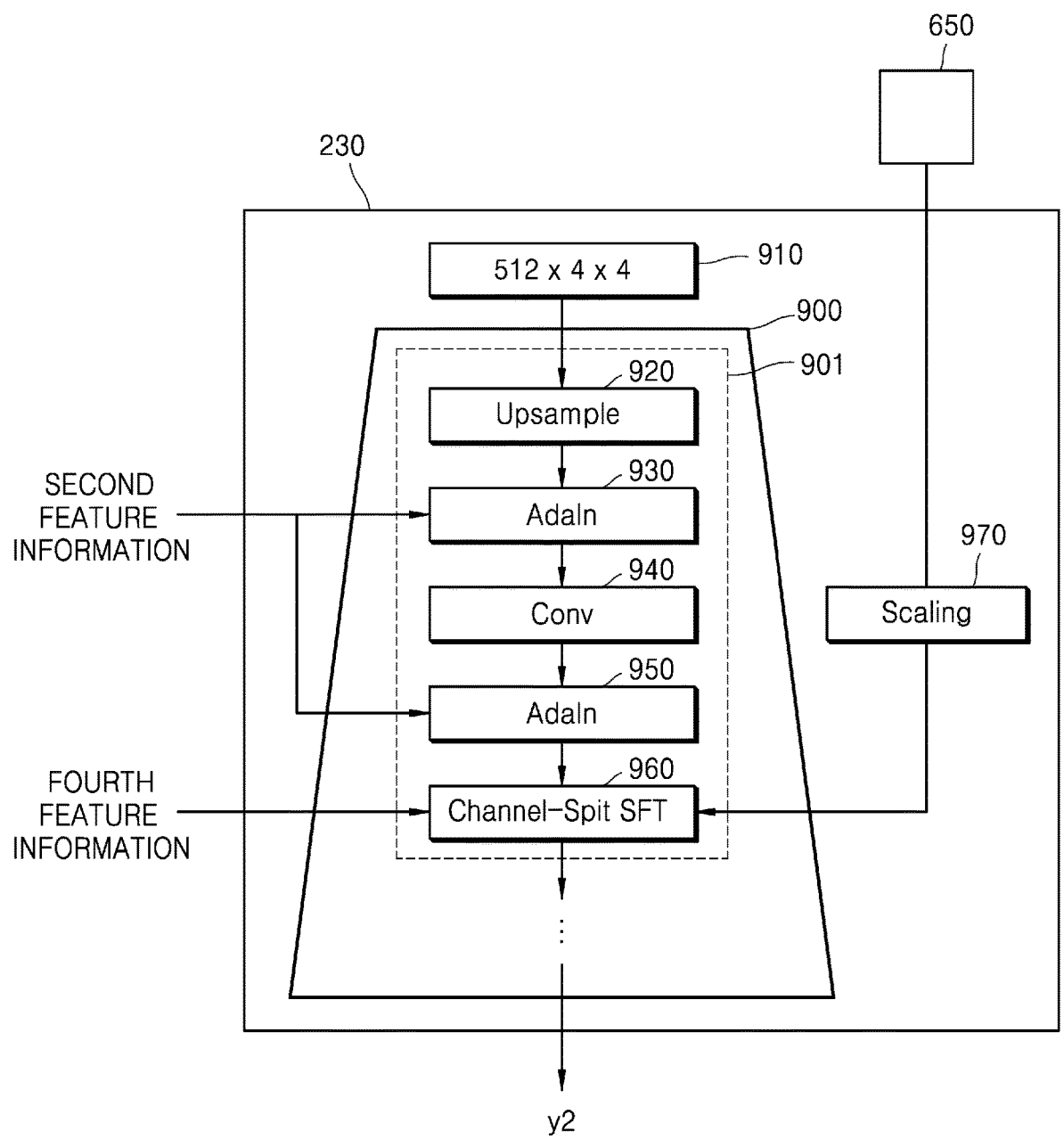
FIG. 9 is a diagram illustrating a second module according to an example embodiment of the disclosure.

FIG. 9 is a diagram illustrating a second module according to an example embodiment of the disclosure.

Referring to FIG. 9, the second module 230 may include a final image generation network 900. The second module 230 may generate a second image y2 by using the final image generation network 900.

As shown in FIG. 9, a pre-trained parameter 910 may be input to the final image generation network 900. For example, the pre-trained parameter 910 may have a size of 512×4×4. According to an example embodiment of the disclosure, the pre-trained parameter 910 may be a parameter trained together when the image processing network 103 is trained. However, the disclosure is not limited thereto.

According to an example embodiment of the disclosure, the second module 230 may obtain first data by upsampling the input parameter 910 in an upsampling layer 920 to obtain third upsampled data.

The second module 230 may perform an adaptive instance normalization (AdaIN) operation via an AdaIN operator 930, based on the first data and second feature information input from the third module 240. The AdaIN operation may be defined as shown in Equation 1 below.

$$AdaIn(x, y) = \sigma(y)\left(\frac{x - \mu(x)}{\sigma(x)}\right) + \mu(y) \qquad \text{[Equation 1]}$$

where μ(.) denotes a mean and σ(.) denotes a standard deviation. AdaIN(x, y) may mean an operation of changing, after normalizing an x value by using a mean and a standard deviation of x, the normalized x value to match a distribution of y by using a mean and a standard deviation of y. In other words, this may mean modulating feature x to match properties of feature y.

Thus, the second module 230 may obtain second data by modulating the first data to match properties of the second feature information via the AdaIN operation in the AdaIN operator 930.

The second module 230 may obtain third data by performing a convolution operation based on the second data and a weight included in a convolution layer 940.

The second module 230 may perform an AdaIN operation via an AdaIN operator 950, based on the third data and the second feature information input from the third module 240. Accordingly, the second module 230 may obtain fourth data by modulating the third data to match properties of the second feature information via the AdaIN operation.

In addition, the second module 230 may obtain fifth data by performing scaling 970 on the attention map 650 input from the map generator 220. The fifth data may be input to a channel-split spatial feature transform (SFT) operator 960.

The second module 230 may perform a channel-split SFT operation via the channel-split SFT operator 960, based on the fourth data, the fourth feature information input from the third module 240, and the fifth data.

A detailed configuration of the channel-split SFT operator 960 will be described in detail with reference to FIG. 10.

Figure 10:
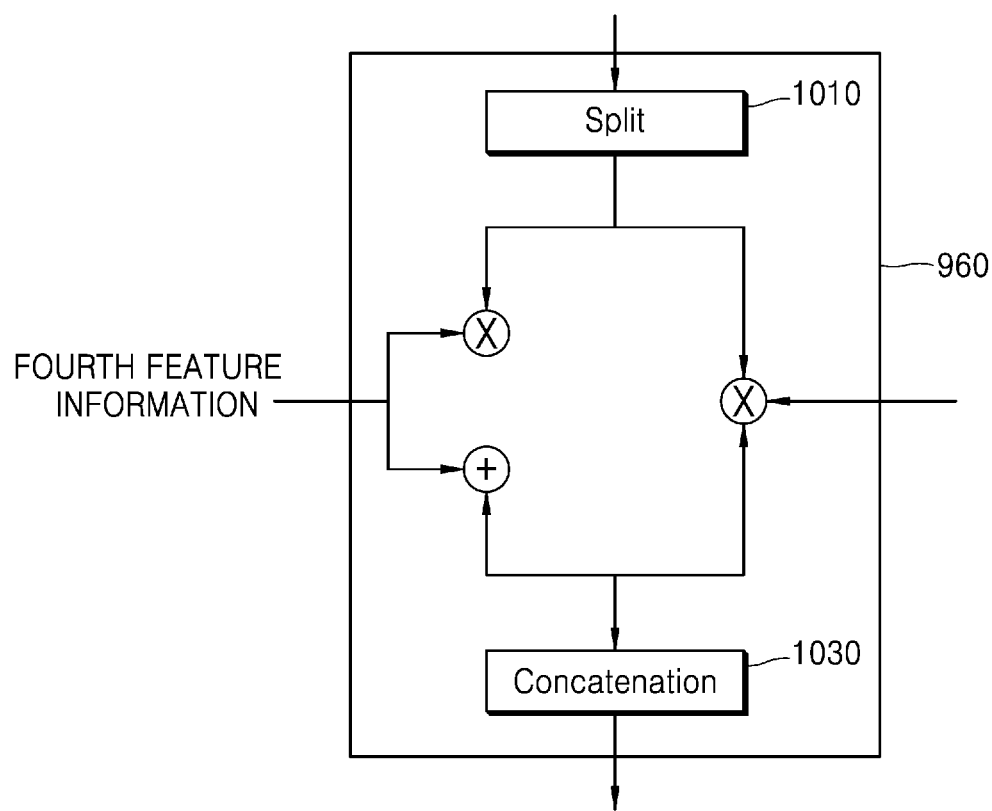
FIG. 10 is a diagram illustrating a channel-split spatial feature transform (SFT) operator according to an example embodiment of the disclosure.

FIG. 10 is a diagram illustrating a channel-split SFT operator according to an example embodiment of the disclosure.

Referring to FIG. 10, the second module 230 may split fourth data into two parts in a split layer 1010 to obtain sixth data and seventh data.

The second module 230 may perform an SFT operation on the sixth data obtained via the splitting and fourth feature information. The SFT operation may be defined as shown in Equation 2 below.

$$SFT(F|\gamma, \beta) = \gamma \odot F + \beta \qquad \text{[Equation 2]}$$

where ⊙ denotes an element-wise multiplication operation, F denotes the sixth data, and γ and β are data based on the fourth feature information. For example, the fourth feature information may be split into two parts and allocated to γ and β, respectively. Therefore, F, γ, and β may all have the same dimension.

SFT (F|γ, β) means modulating properties of the sixth data F by performing affine transform on the sixth data F using the data γ and β. Affine transform is a spatial linear mapping method that may preserve points, straight lines, and planes.

The second module 230 may obtain eighth data by modulating properties of the sixth data using the fourth feature information.

In addition, the second module 230 may obtain ninth data by performing an element-wise multiplication operation on the seventh data obtained via the splitting and the fifth data.

The second module 230 may obtain tenth data by concatenating the eighth data and the ninth data in a concatenation layer 1030.

Referring back to FIG. 9, the final image generation network 900 may include a structure in which a module 901 including the upsampling layer 920, the first AdaIN operator 930, the convolution layer 940, the second AdaIN operator 950, and the channel-split SFT operator 960 is repeatedly arranged in series. However, the disclosure is not limited thereto.

Moreover, the pieces of first to n-th intermediate output data included in the fourth feature information output from the third module 240 may be each input to the channel-split SFT operator 960 included in each module 901. For example, the second module 230 may include a structure in which n modules 901 are arranged in series, and the pieces of first to n-th intermediate output data may be respectively input to channel-split SFT operators 960 respectively included in the n modules 901.

The second module 230 may generate a second image y2 via the n modules 901.

Figure 11:
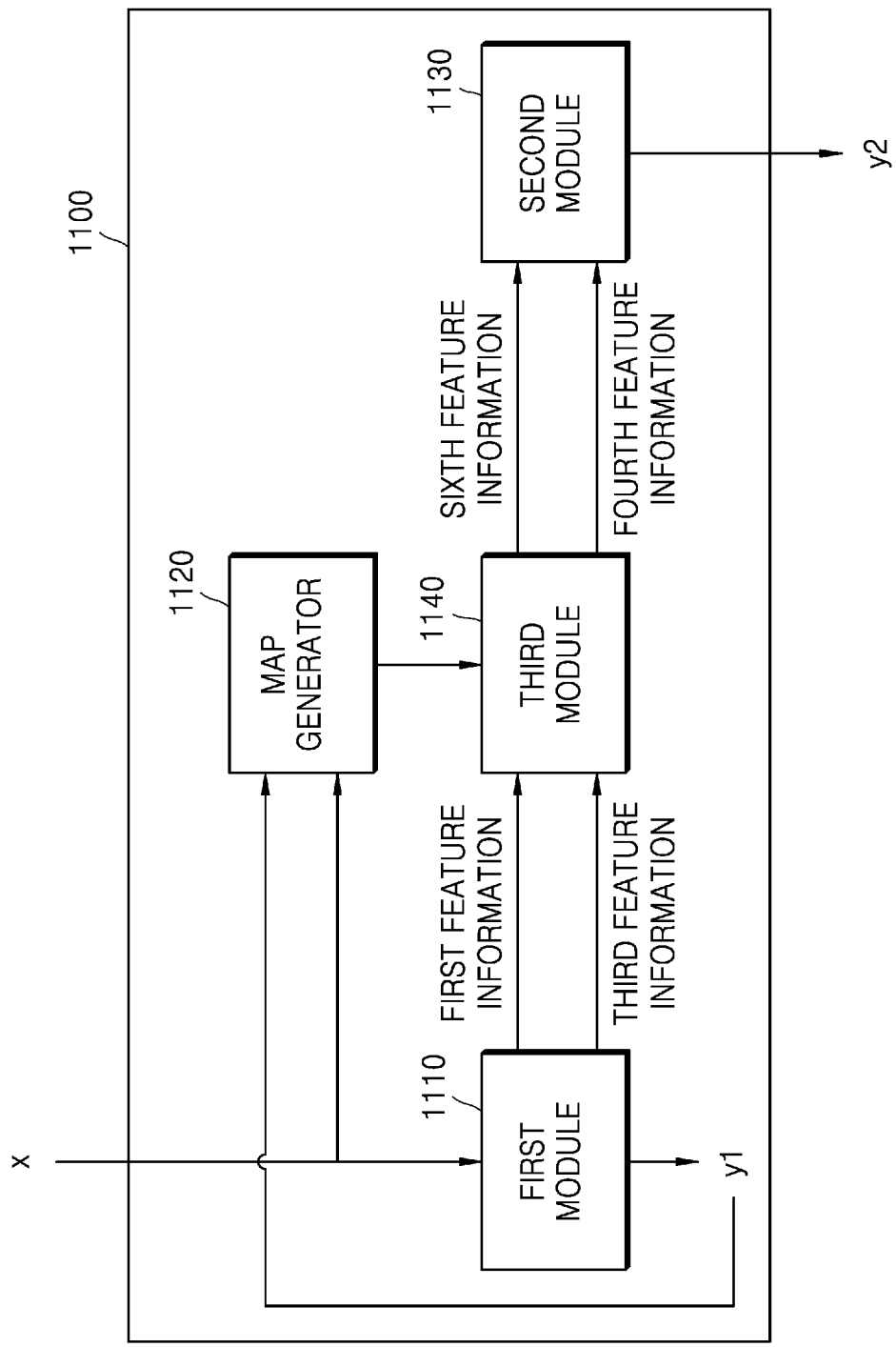
FIG. 11 is a diagram illustrating an image processing network according to an example embodiment of the disclosure.

FIG. 11 is a diagram illustrating an image processing network according to an example embodiment of the disclosure.

An image processing network 1100 of FIG. 11 may be an example embodiment of the image processing network 103 of FIG. 1.

Referring to FIG. 11, the image processing network 1100 may include a first module 1110, a map generator 1120, a second module 1130, and a third module 1140.

According to an example embodiment of the disclosure, a first image x may be input to the first module 1110, and the first module 1110 may obtain first feature information of the first image x.

The first feature information of the first image x obtained by the first module 1110 may be input to the third module 1140.

Also, the first module 1110 may generate an intermediate output image y1 based on the first feature information of the first image x. For example, the first module 1110 may generate the intermediate output image y1 by performing first image processing on the first feature information of the first image x. The intermediate output image y1 may be an image obtained by removing artifacts from the first image x. However, the disclosure is not limited thereto.

Furthermore, the first module 1110 may obtain third feature information extracted during the first image processing, and the third feature information may be input to the third module 1140.

Detailed configuration and operation of the first module 1110 of FIG. 11 may be the same as the detailed configuration and operation of the first module 210 illustrated and described with reference to FIGS. 3 to 5. For example, the first module 1110 may include a first feature extractor and an intermediate image generator, which have been described in detail with reference to FIGS. 3 to 5, and thus, descriptions already provided above will be omitted here.

According to an example embodiment of the disclosure, the map generator 1120 may obtain a residual map based on difference information between the first image x and the intermediate output image y1 and generate an attention map based on the residual map. The attention map generated by the map generator 1120 may be input to the third module 1140.

Detailed configuration and operation of the map generator 1120 of FIG. 11 may be the same as the detailed configuration and operation of the map generator 220 illustrated and described with reference to FIG. 6. For example, the map generator 1120 may obtain a local map and global variance values by using the residual map and generate an attention map by using the local map and the global variance values. Because this has been described in detail with reference to FIG. 6, descriptions already provided above will be omitted here.

According to an example embodiment of the disclosure, the third module 1140 may obtain sixth feature information based on the first feature information of the first image x and the attention map obtained from the map generator 1120. This is described in detail with reference to FIG. 12.

Figure 12:
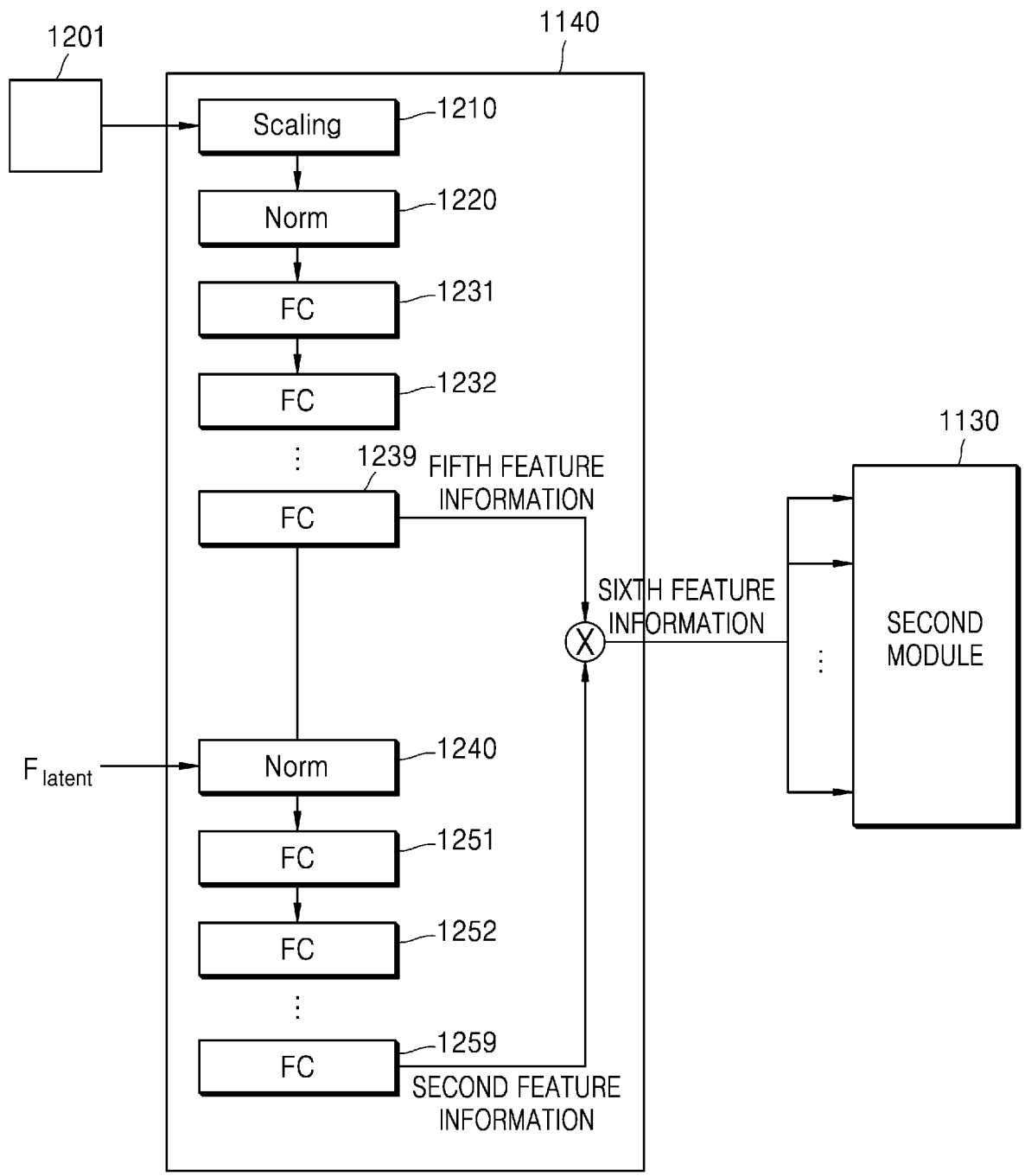
FIG. 12 is a diagram illustrating a third module according to an example embodiment of the disclosure.

FIG. 12 is a diagram illustrating a third module according to an example embodiment of the disclosure.

Referring to FIG. 12, according to an example embodiment of the disclosure, the third module 1140 may perform scaling 1210 on an attention map 1201 and input the scaled attention map to a first normalization layer 1220.

The third module 1140 may obtain first data by normalizing the scaled attention map in the first normalization layer 1220. For example, the third module 1140 may normalize the scaled attention map so that the sum of the scaled attention map becomes 1, but is not limited thereto, and the third module 1140 may normalize the scaled attention map by using various other normalization techniques.

The first data may be input to a MLP module. According to an example embodiment of the disclosure, the third module 1140 may include a MLP module, and the MLP module may include n FC layers. The first data may be input to a first FC layer 1231.

The third module 1140 may perform a multiplication operation between the first data and a first weight matrix included in the first FC layer 1231 and an addition operation with biases included in the first FC layer 1231.

The third module 1140 may perform a multiplication operation between second data output from the first FC layer 1231 and a second weight matrix included in a second FC layer 1232 and an addition operation with biases included in the second FC layer 1232.

Furthermore, the third module 1140 may obtain fifth feature information by performing a multiplication operation between third data output from an n−1-th FC layer and a third weight matrix included in an n-th FC layer 1239 and an addition operation with biases included in the n-th FC layer 1239.

Furthermore, the third module 1140 may normalize, in a second normalization layer 1240, first feature information $F_{latent}$ of a first image input from the first module 1110. For example, the third module 1140 may normalize the first feature information $F_{latent}$ so that the sum of the first feature information $F_{latent}$ becomes 1. However, the disclosure is not limited thereto, and the first feature information $F_{latent}$ may be normalized using various normalization techniques. Data (e.g., fourth data) obtained by normalizing the first feature information $F_{latent}$ may be input to a second MLP module.

According to an example embodiment of the disclosure, the third module 1140 may include the second MLP module, and the second MLP module may include n FC layers. The fourth data may be input to a first FC layer 1251.

The third module 1140 may perform a multiplication operation between the fourth data and a first weight matrix included in the first FC layer 1251 and an addition operation with biases included in the first FC layer 1251.

The third module 1140 may perform a multiplication operation between fifth data output from the first FC layer 1251 and a second weight matrix included in a second FC layer 1252 and an addition operation with biases included in the second FC layer 1252.

Furthermore, the third module 1140 may obtain second feature information by performing a multiplication operation between sixth data output from an n−1-th FC layer and a third weight matrix included in an n-th FC layer 1259 and an addition operation with biases included in the n-th FC layer 1259.

The third module 1140 may obtain sixth feature information by performing an element-wise multiplication operation between the fifth feature information and the sixth feature information.

The sixth feature information may be input to the second module 1130.

Referring back to FIG. 11, the third module 1140 may obtain fourth feature information based on the third feature information. The third module 1140 may generate the fourth feature information by performing third image processing on the third feature information. The third module 1140 of FIG.

11 may include the structure of the third module 240 illustrated and described with reference to FIG. 8. Because the operation, performed by the third module 240, of obtaining the fourth feature information based on the third feature information has been described in detail with reference to FIG. 8, descriptions already provided above will be omitted here.

The fourth feature information obtained by the third module 1140 may be input to the second module 1130.

The second module 1130 may generate a second image y2, based on the sixth feature information and the fourth feature information. This is described in detail with reference to FIG. 13.

Figure 13:
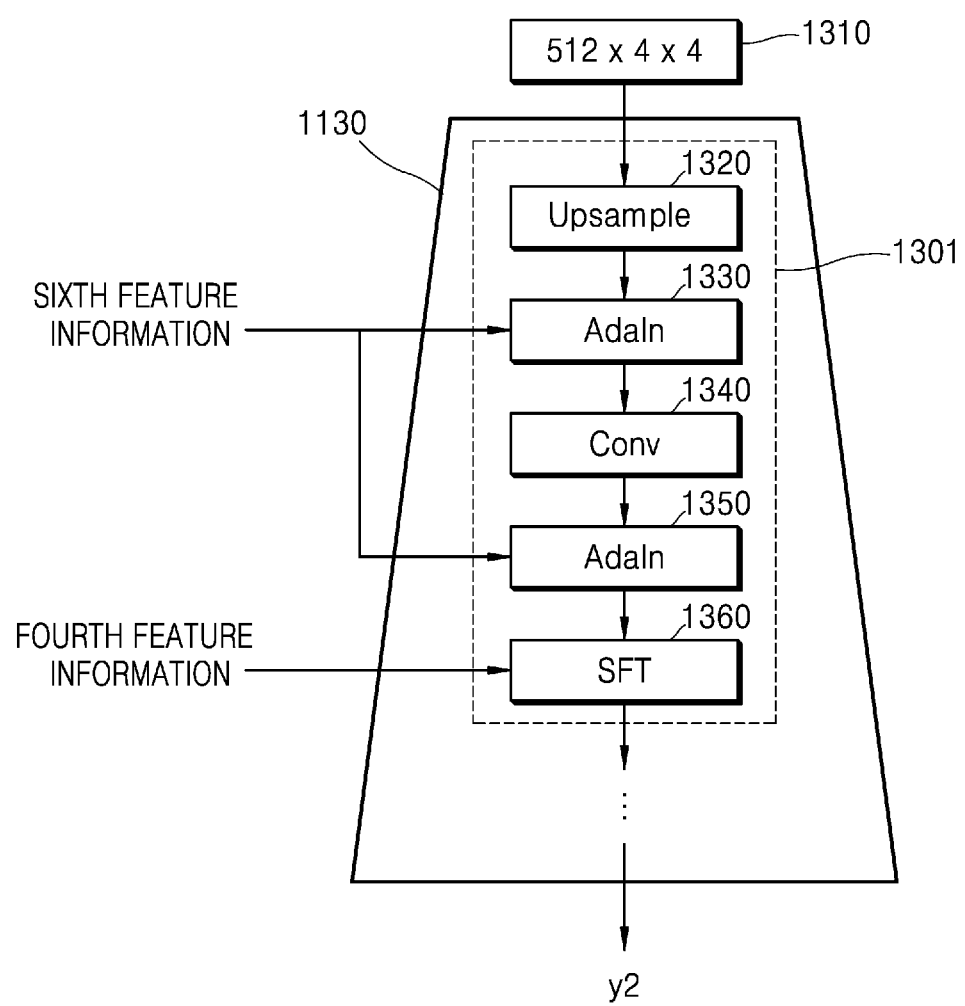
FIG. 13 is a diagram illustrating a second module according to an example embodiment of the disclosure.

FIG. 13 is a diagram illustrating a second module according to an example embodiment of the disclosure.

Referring to FIG. 13, a pre-trained parameter 1310 may be input to the second module 1130. For example, the pre-trained parameter 1310 may have a size of 512×4×4. According to an example embodiment of the disclosure, the pre-trained parameter 1310 may be a parameter trained together when the image processing network 1100 is trained. However, the disclosure is not limited thereto.

According to an example embodiment of the disclosure, the second module 1130 may obtain first data by upsampling the input parameter 1310 in an upsampling layer 1320.

The second module 1130 may perform an AdaIN operation via an AdaIN operator 1330, based on the first data and sixth feature information input from the third module 1140. The AdaIN operation may be expressed as in Equation 1 above.

AdaIN(x, y) of Equation 1 may mean an operation of changing, after normalizing an x value by using a mean and a standard deviation of x, the normalized x value to match a distribution of y by using a mean and a standard deviation of y. In other words, this may mean modulating feature x to match properties of feature y.

Thus, the second module 1130 may obtain second data by modulating the first data to match properties of the sixth feature information via the AdaIN operation in the AdaIN operator 1330.

The second module 1130 may obtain third data by performing a convolution operation based on the second data and a weight included in a convolution layer 1340.

The second module 1130 may perform an AdaIN operation via an AdaIN operator 1350, based on the third data and the sixth feature information input from the third module 1140. Accordingly, the second module 1130 may obtain fourth data by modulating the third data to match properties of the sixth feature information via the AdaIN operation.

The second module 1130 may perform an SFT operation via an SFT operator 1360, based on the fourth data and fourth feature information input from the third module 1140.

The SFT operation may be expressed as in Equation 2 above.

In Equation 2, F denotes the fourth data, and $\gamma$ and $\beta$ are data based on the fourth feature information. For example, the fourth feature information may be adjusted to double a dimension of the fourth data F, divided by 2, and allocated to $\gamma$ and $\beta$, respectively. Therefore, F, $\gamma$, and $\beta$ may all have the same dimension.

SFT (F|$\gamma$, $\beta$) means modulating properties of the fourth data F by performing affine transform on the fourth data F using the data $\gamma$ and $\beta$. Affine transform is a spatial linear mapping method that may preserve points, straight lines, and planes.

The second module 1130 may obtain fifth data by modulating properties of the fourth data using the fourth feature information.

The second module 1130 may include a structure in which a module 1301 including the upsampling layer 1320, the first AdaIN operator 1330, the convolution layer 1340, the second AdaIN operator 1350, and the SFT operator 1360 is repeatedly arranged in series. However, the disclosure is not limited thereto.

Moreover, the pieces of first to n-th intermediate output data included in the fourth feature information output from the third module 1140 may be each input to the SFT operator 1360 included in each module 1301. For example, the second module 1130 may include a structure in which n modules 1301 are arranged in series, and the pieces of first to n-th intermediate output data may be respectively input to SFT operators 1360 respectively included in then modules 1301.

The second module 1130 may generate a second image y2 via the n modules 1130.

The second image y2 may have a higher quality than the first image x.

Figure 14:
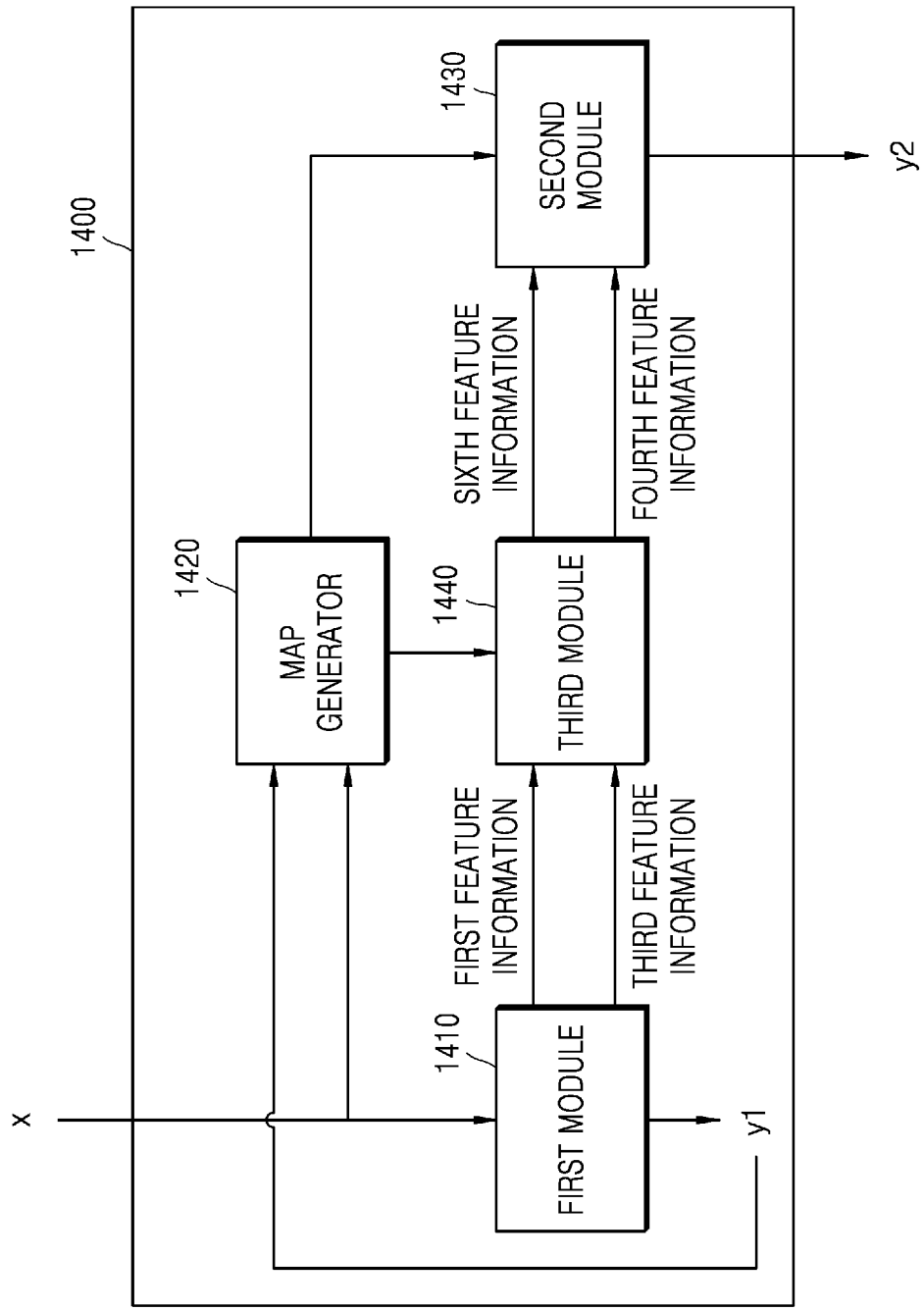
FIG. 14 is a diagram illustrating an image processing network according to an example embodiment of the disclosure.

FIG. 14 is a diagram illustrating an image processing network according to an example embodiment of the disclosure.

An image processing network 1400 of FIG. 14 may be an example embodiment of the image processing network 103 of FIG. 1.

Referring to FIG. 14, the image processing network 1400 may include a first module 1410, a map generator 1420, a second module 1430, and a third module 1440.

According to an example embodiment of the disclosure, a first image x may be input to the first module 1410, and the first module 1410 may obtain first feature information of the first image x.

The first feature information of the first image x obtained by the first module 1410 may be input to the third module 1440.

Also, the first module 1410 may generate an intermediate output image y1 based on the first feature information of the first image x. For example, the first module 1410 may generate the intermediate output image y1 by performing first image processing on the first feature information of the first image x. The intermediate output image y1 may be an image obtained by removing artifacts from the first image x. However, the disclosure is not limited thereto.

Furthermore, the first module 1410 may obtain third feature information extracted during the first image processing, and the third feature information may be input to the third module 1440.

Detailed configuration and operation of the first module 1410 of FIG. 14 may be the same as the detailed configuration and operation of the first module 210 illustrated and described with reference to FIGS. 3 to 5. For example, the first module 1410 may include a first feature extractor and an intermediate image generator, which have been described in detail with reference to FIGS. 3 to 5, and thus, descriptions already provided above will be omitted here.

According to an example embodiment of the disclosure, the map generator 1120 may obtain a residual map based on difference information between the first image x and the intermediate output image y1 and generate an attention map based on the residual map. The attention map generated by the map generator 1420 may be input to the third module 1440 and the second module 1430.

Detailed configuration and operation of the map generator 1420 of FIG. 14 may be the same as the detailed configuration and operation of the map generator 220 illustrated and described with reference to FIG. 6. For example, the map generator 1420 may obtain a local map and global variance values by using the residual map and generate an attention map by using the local map and the global variance values. Because this has been described in detail with reference to FIG. 6, descriptions already provided above will be omitted here.

According to an example embodiment of the disclosure, the third module 1440 may obtain sixth feature information based on the first feature information of the first image x and the attention map obtained from the map generator 1420. Detailed configuration and operation of the third module 1440 may be the same as the detailed configuration and operation of the third module 1140 illustrated and described with reference to FIG. 12. Because the operation of obtaining the sixth feature information based on the first feature information and the attention map has been described in detail with reference to FIG. 12, descriptions already provided above will be omitted here. The sixth feature information obtained by the third module 1440 may be input to the second module 1430.

Furthermore, the third module 1140 may obtain fourth feature information based on the third feature information. The third module 1440 may generate the fourth feature information by performing third image processing on the third feature information. The third module 1440 of FIG. 14 may include the structure of the third module 240 illustrated and described with reference to FIG. 8. Because the operation, performed by the third module 240, of obtaining the fourth feature information based on the third feature information has been described in detail with reference to FIG. 8, descriptions already provided above will be omitted here.

The fourth feature information obtained by the third module 1440 may be input to the second module 1430.

The second module 1430 may generate a second image y2, based on the sixth feature information, the fourth feature information, and the attention map. Detailed configuration and operation of the second module 1430 may be the same as the detailed configuration and operation of the second module 230 illustrated and described with reference to FIG. 9. However, unlike in the second module 230 of FIG. 9, in the second module 1430, the sixth feature information may be input to an AdaIN operator instead of the second feature information, and the other configuration and operation may be the same as in the second module 230. Because the operation of generating a second image based on the second feature information, the fourth feature information, and the attention map has been described in detail with reference to FIG. 9, descriptions already provided above will be omitted here.

Figure 15:
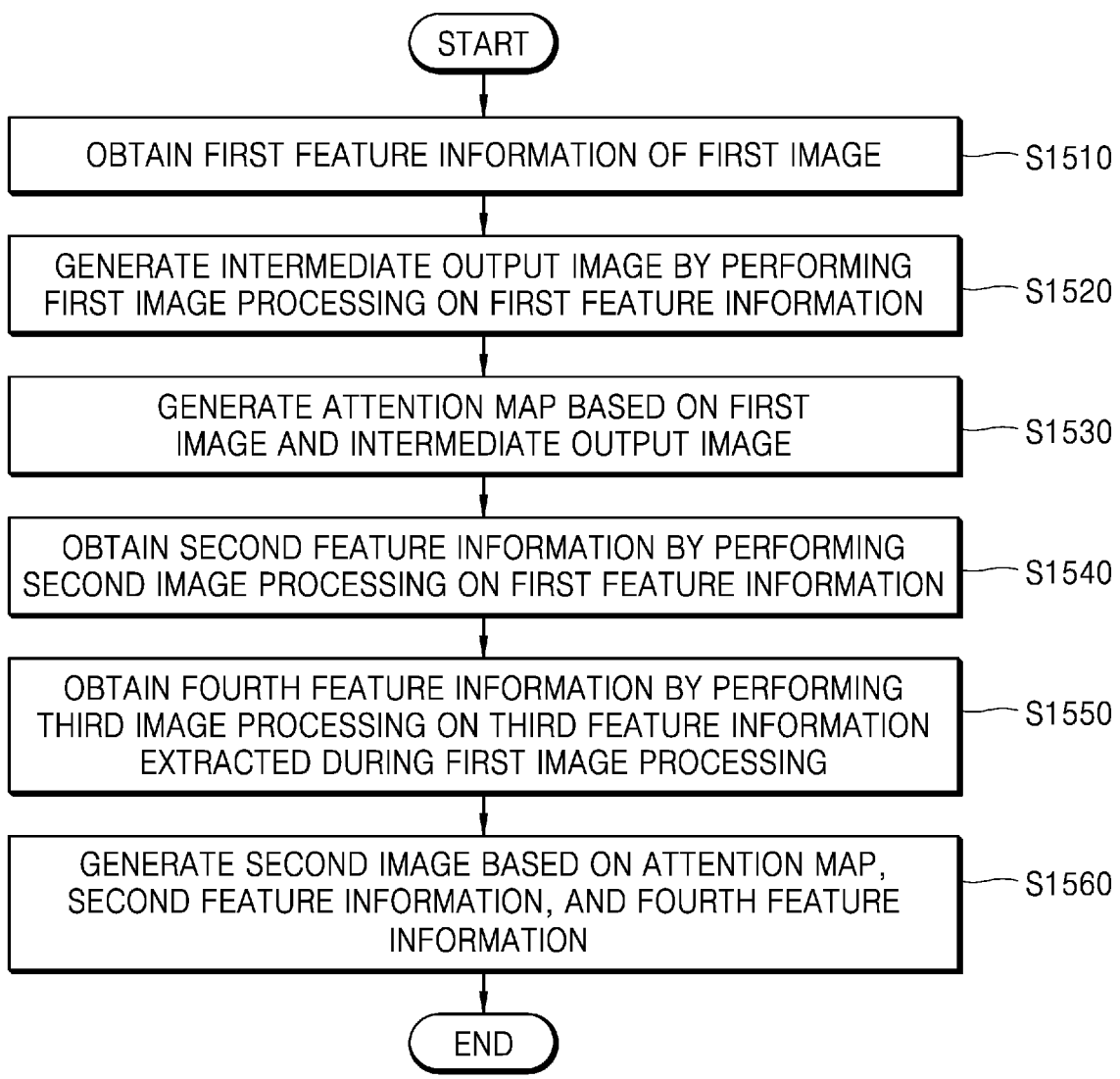
FIG. 15 is a flowchart of an operation method of an image processing apparatus, according to an example embodiment of the disclosure.

FIG. 15 is a flowchart of an operation method of an image processing apparatus, according to an example embodiment of the disclosure.

According to an example embodiment of the disclosure, in operation S1510, the image processing apparatus 100 may obtain first feature information of a first image by using one or more neural networks.

The image processing apparatus 100 may obtain the first feature information of the first image by using a feature extraction network including one or more convolution layers.

For example, the image processing apparatus 100 may obtain the first feature information of the first image by using a first convolution layer, a second convolution layer, a third convolution layer, and an addition layer. The module 401 including the first convolution layer, the second convolution layer, the third convolution layer, and the addition layer, has been described in detail with reference to FIG. 4, and as such, descriptions already provided above will be omitted here.

Furthermore, according to an example embodiment of the disclosure, the image processing apparatus 100 may obtain classification information of the first image. For example, the image processing apparatus 100 may extract the first feature information and the classification information of the first image together by using an image extraction network. However, the disclosure is not limited thereto.

According to an example embodiment of the disclosure, in operation S1520, the image processing apparatus 100 may generate an intermediate output image by performing first image processing on the first feature information of the first image.

The image processing apparatus 100 may generate the intermediate output image by using an intermediate image generator including one or more convolution layers. For example, the image processing apparatus 100 may generate an intermediate output image by using a fourth convolution layer, a first upsampling layer, a fifth convolution layer, a second upsampling layer, a sixth convolution layer, and an addition layer included in the intermediate image generator.

The intermediate image generator has been described in detail with reference to FIG. 5, as such, descriptions already provided above will be omitted here.

According to an example embodiment of the disclosure, when the image processing apparatus 100 obtains classification information, the image processing apparatus 100 may generate an intermediate output image by inputting the first feature information and the classification information together to the intermediate image generator. However, the disclosure is not limited thereto.

According to an example embodiment of the disclosure, in operation S1530, the image processing apparatus 100 may generate an attention map based on the first image and the intermediate output image.

According to an example embodiment of the disclosure, the image processing apparatus 100 may obtain a residual map representing difference information between the first image and the intermediate output image. For example, the image processing apparatus 100 may obtain the residual map by performing an element-wise subtraction operation between the first image and the intermediate output image.

The image processing apparatus 100 may obtain a local map and global variance values by using the residual map. For example, the image processing apparatus 100 may obtain local variance values by using a window having a first size and a local map including the local variance values. Furthermore, the image processing apparatus 100 may obtain global variance values respectively corresponding to patches by using a patch having a second size greater than the first size. Furthermore, the image processing apparatus 100 may generate an attention map by multiplying the local map by the global variance values respectively corresponding to the patches. The structure and the process for generating the attention map have been described in detail with reference to FIG. 6, and as such, descriptions already provided above will be omitted here.

According to an example embodiment of the disclosure, in operation S1540, the image processing apparatus 100 may obtain second feature information by performing second image processing on the first feature information.

For example, the image processing apparatus 100 may generate the second feature information by using one or more neural networks. The image processing apparatus 100 may generate the second feature information by using a normalization layer and first to n-th FC layers. The structure and the process for obtaining the second feature information have been described in detail with reference to FIG. 7, and as such, descriptions already provided above will be omitted here.

According to an example embodiment of the disclosure, in operation S1550, the image processing apparatus 100 may obtain fourth feature information by performing third image processing on third feature information extracted during the first image processing.

For example, the image processing apparatus 100 may obtain the third feature information during the process of generating the intermediate output image based on the first feature information of the first image. Alternatively, the image processing apparatus 100 may obtain the third feature information during the process of generating the intermediate output image based on the first feature information and the classification information of the first image.

The image processing apparatus 100 may obtain the fourth feature information by performing a convolution operation on the third feature information. The structure and process for obtaining the fourth feature have been described in detail with reference to FIG. 8, and as such, descriptions already provided above will be omitted here.

According to an example embodiment of the disclosure, in operation S1560, the image processing apparatus 100 may generate a second image, based on the attention map obtained in operation S1530, the second feature information obtained in operation S1540, and the fourth feature information obtained in operation S1550.

For example, the image processing apparatus 100 may generate the second image by performing upsampling, an AdaIN operation, a convolution operation, a channel-split SFT operation, etc. using the attention map, the second feature information, and the fourth feature information. The structure and the process for generating the second image have been described in detail with reference to FIG. 9, and as such, descriptions already provided above will be omitted here.

According to an example embodiment of the disclosure, the second image may have a higher resolution than the first image, and may be an image whose quality is improved compared to the first image by removing artifacts, noise, etc. from the first image. For example, a number of artifacts in the second image may be less than a number of artifacts in the first image. In another example, an amount of noise in the second image may be less than an amount of noise in the first image.

Figure 16:
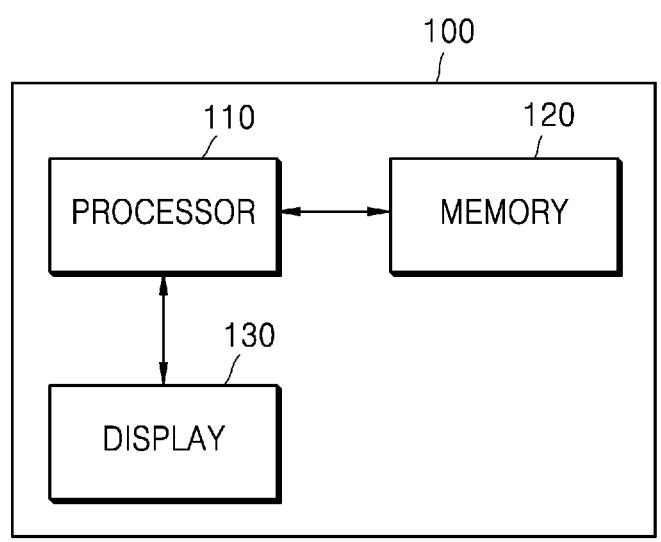
FIG. 16 is a block diagram of a configuration of an image processing apparatus according to an example embodiment of the disclosure.

FIG. 16 is a block diagram of a configuration of an image processing apparatus according to an example embodiment of the disclosure.

An image processing apparatus 100 of FIG. 16 may be an apparatus that performs image processing by using the image processing network 103, 1100, or 1400. According to an example embodiment of the disclosure, the image processing network 103, 1100, or 1400 may include one or more neural networks. For example, the image processing network 103, 1100, or 1400 may include the first module 210, 1110, or 1410, the map generator 220, 1120, or 1420, the second module 230, 1130, or 1430, and the third module 240, 1140, or 1440. However, the disclosure is not limited thereto.

Referring to FIG. 16, according to an example embodiment of the disclosure, the image processing apparatus 100 may include a processor 110, a memory 120, and a display 130.

According to an example embodiment of the disclosure, the processor 110 may control all operations of the image processing apparatus 100. According to an example embodiment of the disclosure, the processor 110 may execute one or more programs stored in the memory 120.

According to an example embodiment of the disclosure, the memory 120 may store various pieces of data, programs, or applications for driving and controlling the image processing apparatus 100. A program stored in the memory 120 may include one or more instructions. A program (one or more instructions) or an application stored in the memory 120 may be executed by the processor 110.

According to an example embodiment of the disclosure, the processor 110 may include at least one of a central processing unit (CPU), a graphics processing unit (GPU), or a video processing unit (VPU). Alternatively, according to an example embodiment of the disclosure, the processor 110 may be implemented in the form of a system-on-chip (SoC) that integrates at least one of a CPU, a GPU, or a VPU. Alternatively, the processor 110 may further include a neural processing unit (NPU).

According to an example embodiment of the disclosure, the processor 110 may generate a second image by processing a first image using one or more neural networks. For example, the processor 110 may use the image processing network 103, 1100, or 1400 to generate a second image by performing denoising for removing noise from the first image while maintaining fine edges and textures thereof. According to an example embodiment of the disclosure, the second image may have a higher quality than the first image. Alternatively, the processor 110 may generate a second image having a higher resolution than the first image by using the image processing network 103, 1100, or 1400.

According to an example embodiment of the disclosure, the processor 110 may obtain first feature information of a first image by using the first module 210, 1110, or 1410. The first module 210, 1110, or 1410 may include a feature extraction network including one or more convolution layers, and the processor 110 may obtain the first feature information of the first image by using the feature extraction network. Because a configuration of the feature extraction network has been described in detail with reference to FIG. 4, a detailed description thereof will be omitted here.

Also, the processor 110 may obtain classification information of the first image by using the first module 210, 1110, or 1410. The classification information of the first image may include data indicating a probability that the first image is included in each of a plurality of preset categories.

Furthermore, the processor 110 may use the first module 210, 1110, or 1410 to generate an intermediate output image by performing first image processing on the first feature information of the first image. Alternatively, the processor 110 may use the first module 210, 1110, or 1410 to generate an intermediate output image by performing first image processing on the first feature information and classification information of the first image.

According to an example embodiment of the disclosure, the intermediate output image may be an image obtained by removing artifacts from the first image. However, the disclosure is not limited thereto.

The first module 210, 1110, or 1410 may generate the intermediate output image by using an intermediate image generator including one or more convolution layers. Because configuration and operation of the intermediate image generator has been described in detail with reference to FIG. 5, a detailed description thereof will be omitted here.

The processor 110 may also extract third feature information during a process of performing the first image processing by using the intermediate image generator.

For example, the processor 110 may obtain third feature information including pieces of first to n-th intermediate data during performing the first image processing.

According to an example embodiment of the disclosure, the processor 110 may generate an attention map, based on the first image and the intermediate output image, by using the map generators 220, 1120, or 1420. Because this has been described in detail with reference to FIG. 6, descriptions already provided above will be omitted here.

According to an example embodiment of the disclosure, the processor 110 may use the third module 240, 1140, or 1440 to obtain second feature information by performing second image processing on the first feature information. Because this has been described in detail with reference to FIG. 7, descriptions already provided above will be omitted here.

According to an example embodiment of the disclosure, the processor 110 may use the third module 240, 1140, or 1440 to obtain fourth feature information by performing third image processing on the third feature information including the pieces of first to n-th intermediate data. Because this has been described in detail with reference to FIG. 8, descriptions already provided above will be omitted here.

According to an example embodiment of the disclosure, the processor 110 may generate a second image, based on the second feature information and the fourth feature information, by using the second module 230, 1130, or 1430.

For example, the processor 110 may generate a second image by performing scaling, upsampling, an AdaIN operation, a convolution operation, a channel-split SFT operation, etc., based on the attention map, the second feature information and the fourth feature information. Because this has been described in detail with reference to FIG. 9, descriptions already provided above will be omitted here.

Moreover, according to an example embodiment of the disclosure, the image processing network 103, 1100, or 1400 may be a network trained by a server or an external device. The external device may train the image processing network 103, 1100, or 1400 based on training data. In this case, the training data may include a plurality of data sets including image data containing noise and image data from which noise is removed while edge features or texture features are preserved.

The server or external device may determine parameter values included in kernels respectively used in a plurality of convolution layers in the image processing network 103, 1100, or 1400 and parameter values included in weight matrices respectively used in linear layers or FC layers. For example, the server or external device may determine parameter values in a direction to minimize a difference (missing information) between image data generated by the image processing network 103, 1100, or 1400 and image data (training data) from which noise is removed while edge features are preserved.

According to an example embodiment of the disclosure, the image processing apparatus 100 may receive the trained image processing network 103, 1100, or 1400 from the server or external device and store the trained image processing network 103, 1100, or 1400 in the memory 120. For example, the memory 120 may store a structure and parameter values of the image processing network 103, 1100, or 1400 according to an example embodiment of the disclosure, and the processor 110 may use the parameter values stored in the memory 120 to generate a second image by removing noise from the first image while preserving edge features, according to an example embodiment of the disclosure.

According to an example embodiment of the disclosure, the display 130 generates a driving signal by converting an image signal, a data signal, an on-screen display (OSD) signal, a control signal, etc. processed by the processor 110. The display 130 may be implemented as a plasma display panel (PDP), a liquid crystal display (LCD), an organic light-emitting diode (OLED) display, a flexible display, or a three-dimensional (3D) display. Furthermore, the display 130 may be formed as a touch screen to serve as an input device as well as an output device.

According to an example embodiment of the disclosure, the display 130 may display the second image obtained by performing image processing using the image processing network 103, 1100, or 1400.

The block diagram of the image processing apparatus 100 of FIG. 16 is provided for illustration of an example embodiment of the disclosure. Each of the components in the block diagram may be integrated, added, or omitted according to the specification of the image processing apparatus 100 that is actually implemented. In other words, two or more components may be combined into a single component, or a single component may be split into two or more components when necessary. Furthermore, functions performed by each block are intended to describe embodiments of the disclosure, and a specific operation or device related to the functions does not limit the scope of the disclosure.

An image processing apparatus according to an example embodiment of the disclosure may process an image by using one or more neural networks. According to an example embodiment of the disclosure, the image processing apparatus may include a memory for storing one or more instructions and at least one processor for executing the one or more instructions.

According to an example embodiment of the disclosure, the at least one processor may execute the one or more instructions stored in the memory to obtain first feature information of a first image.

According to an example embodiment of the disclosure, the at least one processor may execute the one or more instructions stored in the memory to generate an intermediate output image for the first image by performing first image processing on the first feature information.

According to an example embodiment of the disclosure, the at least one processor may execute the one or more instructions stored in the memory to generate an attention map based on the first image and the intermediate output image.

According to an example embodiment of the disclosure, the at least one processor may execute the one or more instructions stored in the memory to obtain second feature information by performing second image processing on the first feature information.

According to an example embodiment of the disclosure, the at least one processor may execute the one or more instructions stored in the memory to obtain fourth feature information by performing third image processing on third feature information extracted during the first image processing.

According to an example embodiment of the disclosure, the at least one processor may execute the one or more instructions stored in the memory to generate a second image having a higher quality than the first image, based on the attention map, the second feature information, and the fourth feature information.

According to an example embodiment of the disclosure, the at least one processor may execute the one or more instructions stored in the memory to obtain a residual map with respect to the first image and the intermediate output image.

According to an example embodiment of the disclosure, the at least one processor may execute the one or more instructions stored in the memory to obtain a local map and global variance values for the residual map.

According to an example embodiment of the disclosure, the at least one processor may execute the one or more instructions stored in the memory to generate the attention map, based on the local map and the global variance values.

The local map may include local variance values of the residual map, which are obtained using a window having a first size.

The global variance values may be obtained using a patch having a second size greater than the first size.

According to an example embodiment of the disclosure, the at least one processor may execute the one or more instructions stored in the memory to obtain fifth feature information by performing fourth image processing on the attention map.

According to an example embodiment of the disclosure, the at least one processor may execute the one or more instructions stored in the memory to obtain sixth feature information, based on the second feature information and the fifth feature information.

According to an example embodiment of the disclosure, the at least one processor may execute the one or more instructions stored in the memory to generate the second image, based on the sixth feature information and the fourth feature information.

According to an example embodiment of the disclosure, the at least one processor may execute the one or more instructions stored in the memory to obtain seventh feature information by performing fifth image processing on the attention map.

According to an example embodiment of the disclosure, the at least one processor may execute the one or more instructions stored in the memory to generate the second image, based on the second feature information, the fourth feature information, and the seventh feature information.

The one or more neural networks may include one or more convolutional neural networks (CNNs).

According to an example embodiment of the disclosure, the at least one processor may execute the one or more instructions stored in the memory to obtain the first feature information of the first image by using the one or more CNNs.

The first image processing may include upsampling the first feature information, and the first image and the intermediate output image may both have the same size.

The second image processing may be performed by a MLP module including one or more FC layers.

According to an example embodiment of the disclosure, the at least one processor may execute the one or more instructions stored in the memory to perform a multiplication operation between input data fed to a FC layer and a weight matrix included in the FC layer and an addition operation with biases included in the FC layer.

According to an example embodiment of the disclosure, the at least one processor may execute the one or more instructions stored in the memory to obtain the fourth feature information by performing a convolution operation between the third feature information and pre-trained weights.

According to an example embodiment of the disclosure, the at least one processor may execute the one or more instructions stored in the memory to obtain eighth feature information by performing a first operation on the second feature information.

According to an example embodiment of the disclosure, the at least one processor may execute the one or more instructions stored in the memory to generate the second image by performing a second operation on the eighth feature information and the fourth feature information.

The first operation may include an AdaIn operation.

The second operation may include an SFT operation.

According to an example embodiment of the disclosure, the at least one processor may execute the one or more instructions stored in the memory to obtain classification information of the first image.

According to an example embodiment of the disclosure, the at least one processor may execute the one or more instructions stored in the memory to generate an intermediate output image for the first image by performing the first image processing on the first feature information and the classification information.

According to an example embodiment of the disclosure, an operation method of an image processing apparatus for processing an image by using one or more neural networks, may include obtaining first feature information of a first image.

According to an example embodiment of the disclosure, the operation method of the image processing apparatus for processing an image by using the one or more neural networks may include generating an intermediate output image for the first image by performing first image processing on the first feature information.

According to an example embodiment of the disclosure, the operation method of the image processing apparatus for processing an image by using the one or more neural networks may include generating an attention map based on the first image and the intermediate output image.

According to an example embodiment of the disclosure, the operation method of the image processing apparatus for processing an image by using the one or more neural networks may include obtaining second feature information by performing second image processing on the first feature information.

According to an example embodiment of the disclosure, the operation method of the image processing apparatus for processing an image by using the one or more neural networks may include obtaining fourth feature information by performing third image processing on third feature information extracted during the first image processing.

According to an example embodiment of the disclosure, the operation method of the image processing apparatus for processing an image by using the one or more neural networks may include generating a second image having a higher quality than the first image, based on the attention map, the second feature information, and the fourth feature information.

The generating of the attention map based on the first image and the intermediate output image may include obtaining a residual map with respect to the first image and the intermediate output image.

The generating of the attention map based on the first image and the intermediate output image may include obtaining a local map and global variance values for the residual map.

The generating of the attention map based on the first image and the intermediate output image may include generating the attention map based on the local map and the global variance values.

The obtaining of the local map and the global variance values for the residual map may include obtaining local variance values of the residual map by using a window having a first size.

The obtaining of the local map and the global variance values for the residual map may include obtaining the global variance values by using a patch having a second size greater than the first size.

The generating of the second image may include obtaining fifth feature information by performing fourth image processing on the attention map.

The generating of the second image may include obtaining sixth feature information, based on the second feature information and the fifth feature information.

The generating of the second image may include generating the second image, based on the sixth feature information and the fourth feature information.

The generating of the second image may include obtaining seventh feature information by performing fifth image processing on the attention map.

The generating of the second image may include generating the second image, based on the second feature information, the fourth feature information, and the seventh feature information.

The obtaining of the first feature information may include obtaining the first feature information of the first image by using the one or more CNNs.

The first image processing may include upsampling the first feature information, and the first image and the intermediate output image may both have the same size.

The second image processing may be performed by a MLP module including one or more FC layers.

The obtaining of the second feature information may include performing a multiplication operation between input data fed to a FC layer and a weight matrix included in the FC layer and an addition operation with biases included in the FC layer.

The obtaining of the fourth feature information may include obtaining the fourth feature information by performing a convolution operation between the third feature information and pre-trained weights.

The generating of the second image may include obtaining eighth feature information by performing a first operation on the second feature information.

The generating of the second image may include generating the second image by performing a second operation on the eighth feature information and the fourth feature information.

The first operation may include an AdaIn operation.

The second operation may include an SFT operation.

According to an embodiment of the disclosure, the operation method of the image processing apparatus may further include obtaining classification information of the first image.

The generating of the intermediate output image may include generating an intermediate output image for the first image by performing the first image processing on the first feature information and the classification information.

An image processing apparatus according to an example embodiment of the disclosure may generate an attention map by using both local information including local variance values of a residual map (a residual image) representing information about artifacts on a first image and global information including global variance values and generate a high-quality second image by processing the first image using the generated attention map.

Accordingly, image processing according to an example embodiment of the disclosure may exhibit improved performance compared to existing image processing techniques. For example, the degree of improvement in the quality of the generated second image or the degree of artifact (noise) removal may be increased compared to in an image processed using the existing image processing techniques.

An operation method of an image processing apparatus according to an example embodiment of the disclosure may be implemented in the form of program commands that may be performed by various types of computers, and may be recorded on computer-readable recording media. The computer-readable recording media may include program commands, data files, data structures, etc. either alone or in combination. The program commands recorded on the computer-readable recording media may be designed and configured specially for the disclosure or may be known to and be usable by those of skill in the art of computer software. Examples of the computer-readable recording media include magnetic media such as hard disks, floppy disks, and magnetic tapes, optical media such as compact disk read-only memory (CD-ROM) and digital versatile disks (DVDs), magneto-optical media such as floptical disks, and hardware devices that are specially configured to store and perform program commands, such as ROM, random access memory (RAM), flash memory, etc. Examples of program commands include not only machine code such as that created by a compiler but also high-level language code that may be executed by a computer using an interpreter or the like.

In addition, an image processing apparatus and an operation method of the image processing apparatus according to embodiments of the disclosure may be included in a computer program product when provided. The computer program product may be traded, as a product, between a seller and a buyer.

The computer program product may include a software program and a computer-readable storage medium having the software program stored thereon. For example, the computer program product may include a product (e.g., a downloadable application) in the form of a software program electronically distributed by a manufacturer of an electronic device or through an electronic market (e.g., Google Play Store and App Store). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. Alternatively, in a case where there is a third device (e.g., a smartphone) communicatively connected to the server or client device, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to embodiments of the disclosure. Alternatively, at least two of the server, the client device, and the third device may execute the computer program product to perform the methods according to the embodiments of the disclosure in a distributed manner.

For example, the server (e.g., a cloud server, an artificial intelligence server, or the like) may execute the computer program product stored therein to control the client device communicatively connected to the server to perform the methods according to the embodiments of the disclosure.

While embodiments of the disclosure have been particularly described above, the embodiments of the disclosure are not to be construed as limiting the scope of the disclosure, and various modifications and improvements made by those skilled in the art based on a basic concept of the disclosure also fall within the scope of the disclosure as defined by the following claims.

What is claimed is:

1. An image processing apparatus for processing an image using one or more neural networks, the image processing apparatus comprising:
   a memory storing one or more instructions; and
   at least one processor configured to execute the one or more instructions stored in the memory to:
   obtain first feature information of a first image,
   generate an output image by performing a first processing on the first feature information,
   generate an attention map based on the first image and the output image,
   obtain second feature information by performing a second processing on the first feature information,
   obtain third feature information during the first processing,
   obtain fourth feature information by performing a third processing on the third feature information, and
   generate a second image having a second quality that is higher quality than a first quality of the first image, the generating the second image being based on the attention map, the second feature information, and the fourth feature information.

2. The image processing apparatus of claim 1, wherein the at least one processor is further configured to execute the one or more instructions stored in the memory to:
   obtain a residual map corresponding to the first image and the output image,
   obtain a local map and global variance values for the residual map, and
   generate the attention map, based on the local map and the global variance values.

3. The image processing apparatus of claim 2, wherein the local map comprises local variance values of the residual map, the local variance values being obtained using a window having a first size, and
   the global variance values are obtained using a patch having a second size greater than the first size.

4. The image processing apparatus of claim 1, wherein the at least one processor is further configured to execute the one or more instructions stored in the memory to:
   obtain fifth feature information by performing a fourth processing on the attention map,
   obtain sixth feature information based on the second feature information and the fifth feature information, and
   generate the second image based on the sixth feature information and the fourth feature information.

5. The image processing apparatus of claim 1, wherein the at least one processor is further configured to execute the one or more instructions stored in the memory to:
   obtain seventh feature information by performing a fifth processing on the attention map, and
   generate the second image based on the second feature information, the fourth feature information, and the seventh feature information.

6. The image processing apparatus of claim 1, wherein the one or more neural networks comprise one or more convolutional neural networks, and
   the at least one processor is further configured to execute the one or more instructions stored in the memory to obtain the first feature information of the first image by using the one or more convolutional neural networks.

7. The image processing apparatus of claim 1, wherein the first processing comprises upsampling the first feature information, and
   wherein the first image and the output image both have a same size.

8. The image processing apparatus of claim 1, wherein the second processing is performed by a multi-layer perceptron (MLP) module comprising one or more fully connected layers, and
   the at least one processor is further configured to execute the one or more instructions stored in the memory to perform a multiplication operation between input data fed to a fully connected layer and a weight matrix included in the fully connected layer and an addition operation with biases included in the fully connected layer.

9. The image processing apparatus of claim 1, wherein the at least one processor is further configured to execute the one or more instructions stored in the memory to obtain the fourth feature information by performing a convolution operation based on the third feature information and pre-trained weights.

10. The image processing apparatus of claim 1, wherein the at least one processor is further configured to execute the one or more instructions stored in the memory to:
    obtain eighth feature information by performing a first operation on the second feature information, and
    generate the second image by performing a second operation on the eighth feature information and the fourth feature information.

11. The image processing apparatus of claim 10, wherein the first operation comprises an adaptive instance normalization (AdaIN) operation, and
    the second operation comprises a spatial feature transform (SFT) operation.

12. The image processing apparatus of claim 1, wherein the at least one processor is further configured to execute the one or more instructions stored in the memory to:
    obtain classification information of the first image, and
    generate the output image by performing the first processing on the first feature information and the classification information.

13. The image processing apparatus of claim 1, wherein the second image of the second quality, has less artifacts or less noise, when compared to the first image of the first quality.

14. An operation method of an image processing apparatus for processing an image by using one or more neural networks, the operation method comprising:
    obtaining first feature information of a first image;
    generating an output image by performing a first processing on the first feature information;
    generating an attention map, based on the first image and the output image;

obtaining second feature information by performing a second processing on the first feature information;
obtain third feature information during the first processing,
obtaining fourth feature information by performing a third processing on the third feature information; and
generating a second image having a second quality that is higher than a first quality of the first image, the generating the second image being based on the attention map, the second feature information, and the fourth feature information.

15. The operation method of claim 14, wherein the generating of the attention map based on the first image and the output image comprises:
obtaining a residual map corresponding to the first image and the output image;
obtaining a local map and global variance values for the residual map; and
generating the attention map, based on the local map and the global variance values.

16. The operation method of claim 15, wherein the obtaining of the local map and the global variance values for the residual map comprises:
obtaining local variance values of the residual map by using a window having a first size; and
obtaining the global variance values by using a patch having a second size greater than the first size.

17. The operation method of claim 14, wherein the generating of the second image comprises:
obtaining fifth feature information by performing a fourth processing on the attention map;
obtaining sixth feature information, based on the second feature information and the fifth feature information; and
generating the second image, based on the sixth feature information and the fourth feature information.

18. The operation method of claim 14, wherein the generating of the second image comprises:
obtaining seventh feature information by performing a fifth processing on the attention map; and
generating the second image based on the second feature information, the fourth feature information, and the seventh feature information.

19. The operation method of claim 14, wherein the obtaining of the first feature information comprises obtaining the first feature information of the first image by using one or more convolutional neural networks.

20. A non-transitory computer-readable recording medium having stored therein a program for performing the operation method of claim 14.

* * * * *